(12) United States Patent
Keating et al.

(10) Patent No.: US 9,514,570 B2
(45) Date of Patent: Dec. 6, 2016

(54) AUGMENTATION OF TANGIBLE OBJECTS AS USER INTERFACE CONTROLLER

(71) Applicant: QUALCOMM Incorporated, San Diego, CA (US)

(72) Inventors: Virginia Walker Keating, San Diego, CA (US); Michael Gervautz, Vienna (AT); Per O. Nielsen, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 13/815,813

(22) Filed: Mar. 15, 2013

(65) Prior Publication Data

US 2014/0028850 A1 Jan. 30, 2014

Related U.S. Application Data

(60) Provisional application No. 61/676,255, filed on Jul. 26, 2012, provisional application No. 61/676,274, filed on Jul. 26, 2012, provisional application No. 61/676,246, filed on Jul. 26, 2012, provisional application No. 61/676,249, filed on Jul. 26, 2012, provisional application No. 61/676,278, filed on Jul. 26, 2012.

(51) Int. Cl.
*H04N 7/18* (2006.01)
*G06T 19/00* (2011.01)
(Continued)

(52) U.S. Cl.
CPC ............ *G06T 19/006* (2013.01); *A63F 13/00* (2013.01); *G06F 3/005* (2013.01); *G06F 3/01* (2013.01); *G06F 3/011* (2013.01); *G06F 3/0304* (2013.01); *G06K 9/00201* (2013.01); *G06K 9/00671* (2013.01);
(Continued)

(58) Field of Classification Search
USPC ........................................................ 348/158
See application file for complete search history.

(56) References Cited

U.S. PATENT DOCUMENTS 5,588,139 A 12/1996 Lanier et al.
6,175,954 B1 1/2001 Nelson et al.
(Continued)

FOREIGN PATENT DOCUMENTS

CN 102402842 A 4/2012
EP 2105179 A1 9/2009
(Continued)

OTHER PUBLICATIONS

International Search Report and Written Opinion—PCT/US2013/048665—ISA/EPO—Sep. 20, 2013.
(Continued)

*Primary Examiner* — Tracy Y Li
(74) *Attorney, Agent, or Firm* — Silicon Valley Patent Group LLP

(57) ABSTRACT

Method, computer program product, and apparatus for providing interactions of tangible and augmented reality objects are disclosed. In one embodiment, a method of controlling a real object using a device having a camera comprises receiving a selection of at least one object, tracking the at least one object in a plurality of images captured by the camera, and causing control signals to be transmitted from the device to the real object via a machine interface based at least in part on the tracking.

31 Claims, 20 Drawing Sheets

(51) Int. Cl.

| | | |
|---|---|---|
| *H04N 21/41* | (2011.01) | |
| *H04N 21/422* | (2011.01) | |
| *H04N 21/482* | (2011.01) | |
| *H04N 21/485* | (2011.01) | |
| *G06T 7/20* | (2006.01) | |
| *G06F 3/00* | (2006.01) | |
| *G06F 3/01* | (2006.01) | |
| *G06F 3/03* | (2006.01) | |
| *G06K 9/00* | (2006.01) | |
| *G06K 9/46* | (2006.01) | |
| *A63F 13/00* | (2014.01) | |
| *G06T 7/00* | (2006.01) | |
| *G06F 3/048* | (2013.01) | |
| *A63F 13/2145* | (2014.01) | |

(52) U.S. Cl.
CPC ......... *G06K 9/4671* (2013.01); *G06T 7/2033* (2013.01); *H04N 7/185* (2013.01); *H04N 21/4126* (2013.01); *H04N 21/42208* (2013.01); *H04N 21/42224* (2013.01); *H04N 21/482* (2013.01); *H04N 21/4852* (2013.01); *A63F 13/2145* (2014.09); *A63F 2300/105* (2013.01); *A63F 2300/1075* (2013.01); *A63F 2300/1087* (2013.01); *A63F 2300/405* (2013.01); *A63F 2300/69* (2013.01); *A63F 2300/8082* (2013.01); *G06F 3/048* (2013.01); *G06T 7/004* (2013.01)

(56) References Cited

U.S. PATENT DOCUMENTS

| | | | |
|---|---|---|---|
| 6,616,454 | B2 | 9/2003 | Ebersole et al. |
| 7,050,078 | B2 | 5/2006 | Dempski |
| 7,536,030 | B2 | 5/2009 | Wang et al. |
| 7,724,258 | B2 | 5/2010 | Ebert et al. |
| 7,768,534 | B2 | 8/2010 | Pentenrieder et al. |
| 7,774,044 | B2 | 8/2010 | Sauer et al. |
| 7,777,642 | B2 | 8/2010 | Kim et al. |
| 8,264,505 | B2 | 9/2012 | Bathiche et al. |
| 8,314,815 | B2 | 11/2012 | Navab et al. |
| 8,358,320 | B2 | 1/2013 | Zhou et al. |
| 8,928,796 | B2 | 1/2015 | Van Heugten et al. |
| 2004/0145594 | A1 | 7/2004 | Kobayashi et al. |
| 2004/0193413 | A1 | 9/2004 | Wilson et al. |
| 2006/0184003 | A1 | 8/2006 | Lewin et al. |
| 2007/0222746 | A1 | 9/2007 | LeVine |
| 2008/0225041 | A1 | 9/2008 | El Dokor et al. |
| 2010/0001998 | A1 | 1/2010 | Mandella et al. |
| 2010/0013860 | A1 | 1/2010 | Mandella et al. |
| 2010/0030578 | A1 | 2/2010 | Siddique et al. |
| 2010/0086218 | A1 | 4/2010 | Tateno |
| 2010/0150404 | A1 | 6/2010 | Marks et al. |
| 2011/0021180 | A1 | 1/2011 | Ray |
| 2011/0138416 | A1 | 6/2011 | Kang et al. |
| 2011/0164163 | A1 | 7/2011 | Bilbrey et al. |
| 2011/0167350 | A1 | 7/2011 | Hoellwarth |
| 2011/0187527 | A1 | 8/2011 | Goodwill et al. |
| 2011/0310227 | A1 | 12/2011 | Konertz et al. |
| 2011/0316845 | A1 | 12/2011 | Roberts et al. |
| 2012/0026192 | A1 | 2/2012 | Lim |
| 2012/0038549 | A1 | 2/2012 | Mandella et al. |
| 2012/0057032 | A1 | 3/2012 | Jang et al. |
| 2012/0075168 | A1 | 3/2012 | Osterhout et al. |
| 2012/0075343 | A1 | 3/2012 | Chen et al. |
| 2012/0075345 | A1* | 3/2012 | Lee .................. G06F 17/30247 345/633 |
| 2012/0087580 | A1 | 4/2012 | Woo et al. |
| 2012/0105703 | A1 | 5/2012 | Lee et al. |
| 2012/0113223 | A1 | 5/2012 | Hilliges et al. |
| 2012/0120070 | A1 | 5/2012 | Baillot |
| 2012/0128241 | A1 | 5/2012 | Jung |
| 2012/0146998 | A1 | 6/2012 | Kim et al. |
| 2012/0151347 | A1 | 6/2012 | McClements, IV |
| 2012/0188342 | A1 | 7/2012 | Gervautz et al. |
| 2012/0195460 | A1 | 8/2012 | Lawrence |
| 2012/0195461 | A1 | 8/2012 | Lawrence |
| 2012/0206485 | A1 | 8/2012 | Osterhout et al. |
| 2012/0215543 | A1 | 8/2012 | Oez et al. |
| 2012/0242865 | A1* | 9/2012 | Vartanian et al. ............ 348/239 |
| 2012/0243732 | A1 | 9/2012 | Swaminathan et al. |
| 2012/0243743 | A1 | 9/2012 | Pastor et al. |
| 2012/0244907 | A1 | 9/2012 | Athsani et al. |
| 2012/0249528 | A1 | 10/2012 | Park et al. |
| 2013/0050432 | A1 | 2/2013 | Perez et al. |
| 2013/0063560 | A1 | 3/2013 | Roberts et al. |
| 2013/0155108 | A1 | 6/2013 | Williams et al. |
| 2013/0215148 | A1 | 8/2013 | Antonyuk et al. |
| 2013/0305437 | A1 | 11/2013 | Weller et al. |
| 2013/0314303 | A1 | 11/2013 | Osterhout et al. |
| 2014/0014637 | A1* | 1/2014 | Hunt ....................... 219/124.22 |
| 2014/0028712 | A1 | 1/2014 | Keating et al. |
| 2014/0028713 | A1 | 1/2014 | Keating et al. |
| 2014/0028714 | A1 | 1/2014 | Keating et al. |
| 2014/0063054 | A1 | 3/2014 | Osterhout et al. |
| 2014/0063055 | A1 | 3/2014 | Osterhout et al. |

FOREIGN PATENT DOCUMENTS

| | | | |
|---|---|---|---|
| EP | 2111901 | A2 | 10/2009 |
| EP | 2400464 | A2 | 12/2011 |
| WO | 0229711 | A2 | 4/2002 |
| WO | 2007106046 | A2 | 9/2007 |
| WO | 2012009789 | A2 | 1/2012 |
| WO | 2012039676 | A1 | 3/2012 |

OTHER PUBLICATIONS

Antoniac P., "Augmented Reality based User Interface for Mobile Applications and Services," University of Oulu, 2005, pp. 1-181,URL http://herkules.oulu.fi/isbn9514276965/isbn9514276965.pdf.

Ballagas R., et al., "The smart phone: a ubiquitous input device," IEEE Pervasive Computing, Jan.-Mar. 2006, vol. 5 (1), pp. 70-77, URL: http://ieeexplore.ieee.org/stamp/stamp.jsp?tp=&arnumber=1593574&isnumber=33539.

Billinghurst M., et al., "Collaboration with Tangible Augmented Reality Interfaces," In Proceedings of the Ninth International Conference on Human-Computer Interaction 2001, pp. 1-5, http://citeseerx.ist.psu.edu/viewdoc/download;jsessionid=5FB35F83B0215975B018353CC9850A07?doi=10.1.1.98.766&rep=rep1&type=pdf.

Billinghurst M., et al., "Tangible Augmented Reality," In ACM SIGGRAPH ASIA 2008 courses (SIGGRAPH Asia), ACM, New York, NY, USA, Article 7, 2008, 10 pages, URL: http://doi.acm.org/10.1145/1508044.1508051.

Boring S., "Touch projector: mobile interaction through video," In Proceedings of the 28th international conference on Human factors in computing systems (CHI), ACM, New York, NY, USA, 2010, pp. 2287-2296, URL: http://doi.acm.org/10.1145/1753326.1753671.

Chen L.H., et al., "A remote Chinese chess game using mobile phone augmented reality," In Proceedings of the 2008 International Conference on Advances in Computer Entertainment Technology (ACE), ACM, New York, NY, USA, 2008, pp. 284-287, URL: http://doi.acm.org/10.1145/1501750.1501817.

Chen R., et al., "An Empirical Study on Tangible Augmented Reality Learning Space for Design Skill Transfer," Tsinghua Science and Technology, vol. 13 (1), 2008, pp. 13-18, URL: http://www.sciencedirect.com/science?_ob=Mlmg&_imagekey=B7RKT-4TX6FMS-3-1&_cdi=25731&_user=4757105&_pii=S1007021408701202&_orgin=search&_coverDate=10%2F31%2F2008&_sk=999869999.8998&view=c&wchp=dGLzVtb-zSkzS&md5=cd34d81eaf65bbc2b21b95f0bc333323&ie=/sdarticle.pdf.

Choumane A., et al., "Buttonless clicking: Intuitive select and pick-release through gesture analysis," IEEE Virtual Reality Conference (VR), Mar. 20-24, 2010, pp. 67-70.

(56) References Cited

OTHER PUBLICATIONS

Ha T., "An empirical evaluation of virtual hand techniques for 3D object manipulation in a tangible augmented reality environment," IEEE Symposium on 3D User Interfaces (3DUI), Mar. 2010, pp. 91-98, 20-21, URL: http://www.ieeexplore.ieee.org/stamp/stamp.jsp?tp=&arnumber=5444713&isnumber=5444694.

Hachet M., et al., "3D Interaction With and From Handheld Computers," Proceedings of IEEE VR 2005 Workshop: New Directions in 3D User Interfaces, 2005, pp. 1-5, URL: http://iparla.labri.fr/publications/2005/HK05/hach.

Hansen et al "Mixed Interaction Spaces—a new interaction technique for mobile devices", Demonstrated: Tokyo, Japan, UbiComp Conference, 2005, pp. 1-2.

Henrysson A., et al., "Mobile phone based AR scene assembly," In Proceedings of the 4th international conference on Mobile and ubiquitous multimedia (MUM '05), ACM, New York, NY, USA, 2005, pp. 95-102, URL: http://doi.acm.org/10.1145/1149488.1149504.

Henrysson A., et al., "Virtual object manipulation using a mobile phone," In Proceedings of the 2005 international conference on Augmented tele-existence (ICAT), ACM, New York, NY, USA, 2005, pp. 164-171. http://doi.acm.org/10.1145/1152399.1152430.

Henze N., et al., "Mobile interaction with the real world," In Proceedings of the 10th international conference on Human computer interaction with mobile devices and services (MobileHCI), ACM, New York, NY, USA, 2008, pp. 563-565. http://doi.acm.org/10.1145/1409240.1409351.

Juan C., "Augmented Reality Interactive Storytelling Systems Using Tangible Cubes for Edutainment," In Proceedings of the 2008 Eighth IEEE International Conference on Advanced Learning Technologies (ICALT), IEEE Computer Society, Washington, DC, USA, 2008, pp. 233-235, http://dx.doi.org/10.1109/ICALT.2008.122.

Karayev S., "Virtual Zoom: Augmented Reality on Mobile Device," University of Washington, Honors Thesis in Computer Science, 2009, pp. 1-18, URL: http://sergeykarayev.com/files/vz_thesis.pdf.

Katzakis N., et al., "Mobile Phones as 3-DOF Controllers: A Comparative Study," Eighth IEEE International Conference on Dependable, Autonomic and Secure Computing (DASC), Dec. 12-14, 2009, pp. 345-349, URL: http://www.ieeexplore.ieee.org/stamp/stamp.jsp?tp=&arnumber=5380602&isnumber=5380134.

Kray C., "Swiss Army Knife meets Camera Phone: Tool Selection and Interaction using Visual Markers," Proceedings of Mobile Interaction with the Real World (MIRW), 2007, 4 Pages, URL: http://citeseer.ist.psu.edu/viewdoc/download?doi=10.1.1.136.4952&rep=rep1&type=pdf.

Lee, et al., "Markerless Inspection of Augmented Reality Objects Using Fingertip Tracking," International Symposium on Wearable Computers, Oct. 2007, 8 pp.

Lee, G.A. et al., "Occlusion based Interaction Methods for Tangible Augmented Reality Environments," Proceedings of the 2004 ACM SIGGRAPH International Conference on Virtual Continuum and Its Applications in Industry (VRCAI '04), Jan. 1, 2004, pp. 419-426, XP55005457, 1 New York, New York, USA DOI: 10.1145/1044588.1044680. ISBN: 978-1-58-0113884-9.

Lee G.A. "Freeze-Set-Go interaction method for handheld mobile augmented reality environments," In Proceedings of the 16th ACM Symposium on Virtual Reality Software and Technology (VRST), ACM, New York, NY, USA, 2009, pp. 143-146, URL: http://doi.acm.org/10.1145/1643928.1643961.

Lee W., "Tarboard: Tangible augmented reality system for table-top game environment," In 2nd International Workshop on Pervasive Gaming Applications, vol. 5, 2005, 5 Pages, URL http://www.ipsi.fraunhofer.de/ambiente/pergames2005/papers_2005/PerGames2005_TARBoard_WLee.pdf.

Looser J., "An evaluation of virtual lenses for object selection in augmented reality," In Proceedings of the 5th international conference on Computer graphics and interactive techniques in Australia and Southeast Asia (GRAPHITE), ACM, New York, NY, USA, 2007, pp. 203-210. http://doi.acm.org/10.1145/1321261.1321297.

Oh S., et al., "CAMAR: Context-aware Mobile Augmented Reality in Smart Space," GIST U-VR Lab, 2009, pp. 48-51, URL: http://icserv.gist.ac.kr/mis/publications/data/2009/iwuvr-soh.pdf.

Pierce J.S., et al., "Image plane interaction techniques in 3D immersive environments," In Proceedings of the 1997 symposium on Interactive 3D graphics (I3D), ACM, New York, NY, USA, 1997, pp. 39-ff., URL: http://doi.acm.org/10.1145/253284.253303.

Reimann C., et al., "Computer Vision based Interaction Techniques for mobile Augmented Reality," pp. 1-13, URL http://citeseerx.ist.psu.edu/viewdoc/download?doi=10.1.1.101.2121&rep=rep1&type=pdf.

Reitmayr G., "iOrb—Unifying Command and 3D Input for Mobile Augmented Reality," 2005, 4 Pages, URL:http://www.ims.tuwien.ac.at/publication_detail.php?ims_id=TR-188-2-2005-02.

Rohs M., "Which one is better?—information navigation techniques for spatially aware handheld displays," In Proceedings of the 8th International Conference on Multimodal Interfaces (ICMI), 2006, pp. 1-8, URL: http://citeseerx.ist.psu.edu/viewdoc/download?doi=10.1.1.128.3921&rep=rep1&type=pdf.

Sinclair P., et al., "Adapting Information Through Tangible Augmented Reality Interfaces," In UbiComp 2004, the Sixth International Conference on Ubiquitous Computing, Sep. 2004, 2 Pages, URL: http://citeseerx.ist.psu.edu/viewdoc/download?doi=10.1.1.96.3820&rep=rep1&type=pdf.

Slay H., et al., "Tangible user interaction using augmented reality," Australian Computer Science Communications, vol. 24 (4), Jan. 2002, pp. 13-20, http://dx.doi.org/10.1145/563997.563988.

Ulbricht C., et al., "Tangible Augmented Reality for Computer Games," Proceeding (396) Visualization, Imaging, and Image Processing, 2003, 5 Pages, URL: http://www.cg.tuwien.ac.at/~cu/tangibleAR/viipPaper.pdf.

White S., et al., "Visual Hints for Tangible Gestures in Augmented Reality," In Proceedings of the 2007 6th IEEE and ACM International Symposium on Mixed and Augmented Reality (ISMAR), IEEE Computer Society, Washington, DC, USA, 2007, pp. 1-4. http://dx.doi.org/10.1109/ISMAR.2007.4538824.

White Sean et al., "Interaction and presentation techniques for shake menus in tangible augmented reality", 8th IEEE International Symposium on Mixed and Augmented Reality (ISMAR), Oct. 19, 2009, Piscataway, NJ, USA, IEEE, pp. 39-48, XP031568946, ISBN: 978-1-4244-5390-0.

Yan Q., "Tangible User Interfaces for Augmented Reality," National University of Singapore, 2003, 144 Pages, URL https://scholarbank.nus.edu.sg/bitestream/handle/10635/14133/ThesisV2.pdf?sequence=1.

Kurz, D., et al., "Handheld Augmented Reality involving gravity measurements," Munich Germany, vol. 36, No. 7, Nov. 2012, pp. 866-883.

* cited by examiner

AUGMENTATION OF TANGIBLE OBJECTS AS USER INTERFACE CONTROLLER

CROSS REFERENCE TO RELATED APPLICATIONS

This application claims the benefit of U.S. provisional application No. 61/676,246, "Interactions of Tangible and Augmented Reality Objects" filed Jul. 26, 2012; U.S. provisional application No. 61/676,249, "Maintaining Continuity of Augmentations" filed Jul. 26, 2012; U.S. provisional application No. 61/676,278, "Method and Apparatus for Controlling Augmented Reality" filed Jul. 26, 2012; U.S. provisional application No. 61/676,255, "Interactions of Tangible and Augmented Reality Objects" filed Jul. 26, 2012; and U.S. provisional application No. 61/676,274, "Tangible Items' Effect on Particle System Augmentation in Virtual Spaces" filed Jul. 26, 2012. The aforementioned United States applications are hereby incorporated by reference in their entirety.

FIELD

The present disclosure relates to the field of augmented reality. In particular, the present disclosure relates to interactions of tangible and augmented reality objects.

BACKGROUND

Conventional augmented reality applications provide a live view of a real-world environment whose elements may be augmented by computer-generated sensory input such as video, sound, graphics or GPS data. With such applications, a view of reality may be modified by a computing device, and they can enhance a user's perception of reality and provide more information about the user's environment. For example, augmented contents may be applied in real-time and in semantic context with environmental elements, such as game statistics and summaries during a match. With the proliferation of mobile devices, such as smart phones, information about the surrounding real world of a user may be displayed on a mobile device with additional augmented contents, such as artificial information about the environment with virtual objects being overlaid on the real-world objects.

The conventional augmented reality applications may be improved by enabling users to interact with the tangible and virtual environments with user-defined interfaces. The conventional augmented reality applications may be improved by enabling users to customize their environment to their preference. In addition, the conventional augmented reality applications may be improved by identifying and providing interactions between tangible real-world objects and augmented reality objects, which may further encourage users to engage with their environment. Therefore, there is a need for method, computer program product, and augmented reality enabled device that can improve the conventional augmented reality applications.

SUMMARY

The present disclosure relates to interactions of tangible and augmented reality objects. According to embodiments of the present disclosure, a method of controlling a real object using a device having a camera comprises receiving a selection of at least one object, tracking the at least one object in a plurality of images captured by the camera, and causing control signals to be transmitted from the device to the real object via a machine interface based at least in part on the tracking.

The method of tracking comprises performing 3-dimensional tracking that comprises determining a relative pose of the at least one object with respect to the device, and updating states of the at least one object using the relative pose. The method of determining relative poses comprises detecting the relative pose of the at least one object with respect to a previously captured image of the at least one object. The method of selecting the at least one object comprises zooming in to obtain a close up view of the at least one object. The method of selecting the at least one object comprises placing the at least one object at center screen of the device.

According to aspects of the present disclosure, the real object comprises the at least one object and where causing control signals to be transmitted comprises rendering augmentation of a control mechanism for the at least one object, and providing a user-defined control mechanism on a display of the device.

The method of causing control signals to be transmitted further comprise using motions of the device to emulate operations of the control mechanism. The machine interface comprises at least one of: Bluetooth, Wi-Fi, and IR. The at least one image of the plurality of images can be displayed on a touchscreen of the device, and where the method of receiving a selection of at least one object comprises receiving information regarding a user input on the touchscreen identifying the at least one object.

The method further comprises tracking a radio in view of the device, providing an augmentation of a song playing by the radio, and adjusting a volume of the song based on determining that the radio has been spun. The method further comprises tracking a television in view of the device, determining that an object has been placed near the television, and triggering an augmentation of video playing on the television based on the object has been placed near the television. The method of causing control signals to be transmitted comprises determining that the at least one object has been rotated, and wherein the control signals comprise signals instructing the real object to change channel or change volume.

In another embodiment of the present disclosure, a device for controlling a real object comprises a camera and a control unit including processing logic; the processing logic comprises logic configured to receive a selection of at least one object, logic configured to track the at least one object in a plurality of images captured by the camera, and logic configured to cause control signals to be transmitted from the device to the real object via a machine interface based at least in part on the tracking.

In yet another embodiment of the present disclosure, a computer program product for controlling a real object using a device having a camera comprises a non-transitory medium storing instructions for execution by one or more computer systems; the instructions comprises instructions for receiving a selection of at least one object, instructions for tracking the at least one object in a plurality of images captured by the camera, and instructions for causing control signals to be transmitted from the device to the real object via a machine interface based at least in part on the tracking.

In yet another embodiment of the present disclosure, a system for controlling a real object using a device having a camera comprises means for receiving a selection of at least one object, means for tracking the at least one object in a plurality of images captured by the camera, and means for causing control signals to be transmitted from the device to the real object via a machine interface based at least in part on the tracking.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of interactions of tangible and augmented reality objects are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
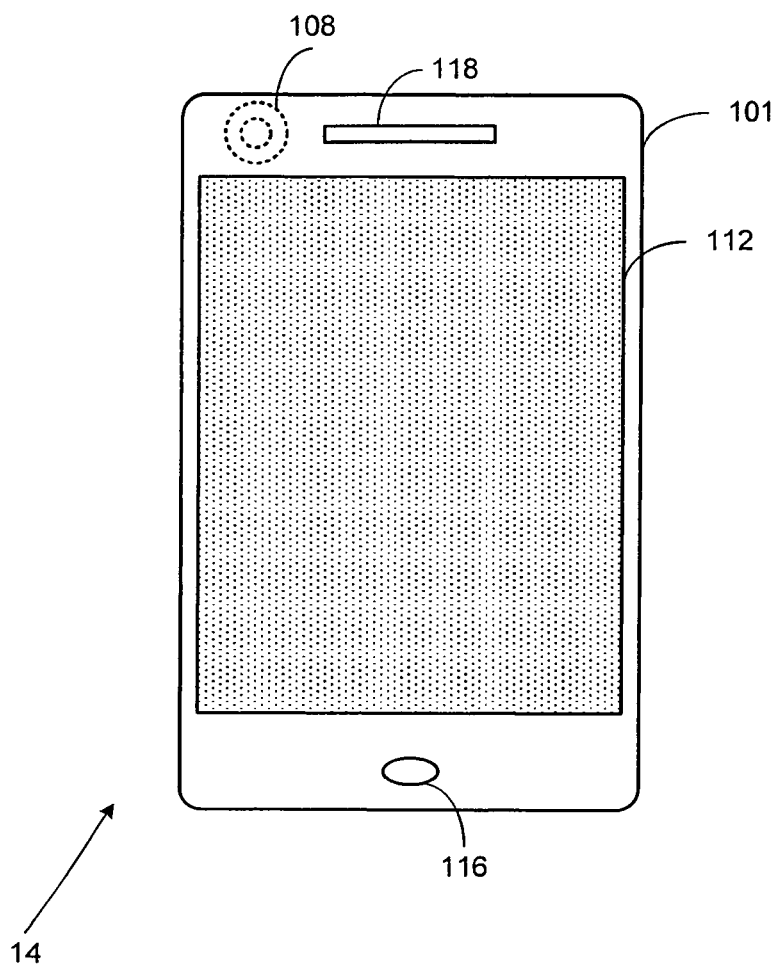
FIG. 1 illustrates an augmented reality enabled device according to some aspects of the present disclosure.

FIG. 1 illustrates an augmented reality enabled device according to some aspects of the present disclosure. As shown in FIG. 1, the augmented reality enabled device (ARD) 14 includes housing 101, display 112, one or more speakers 118, and microphone 116. The display 112, which may be a touch screen display, may illustrate images captured by the camera 108, or any other desired user interface information. Of course, the ARD 14 may include additional components that are not necessarily related to the present disclosure.

As used herein, an ARD device refers to any portable electronic device such as a cellular or other wireless communication device, personal communication system-(PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term ARD is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, ARD is intended to include all electronic devices, including wireless communication devices, computers, laptops, tablet computers, smart phones, digital cameras etc. which are capable of capturing images used in pose tracking, as well as capable of performing augmented reality user interface functions.

Figure 2:
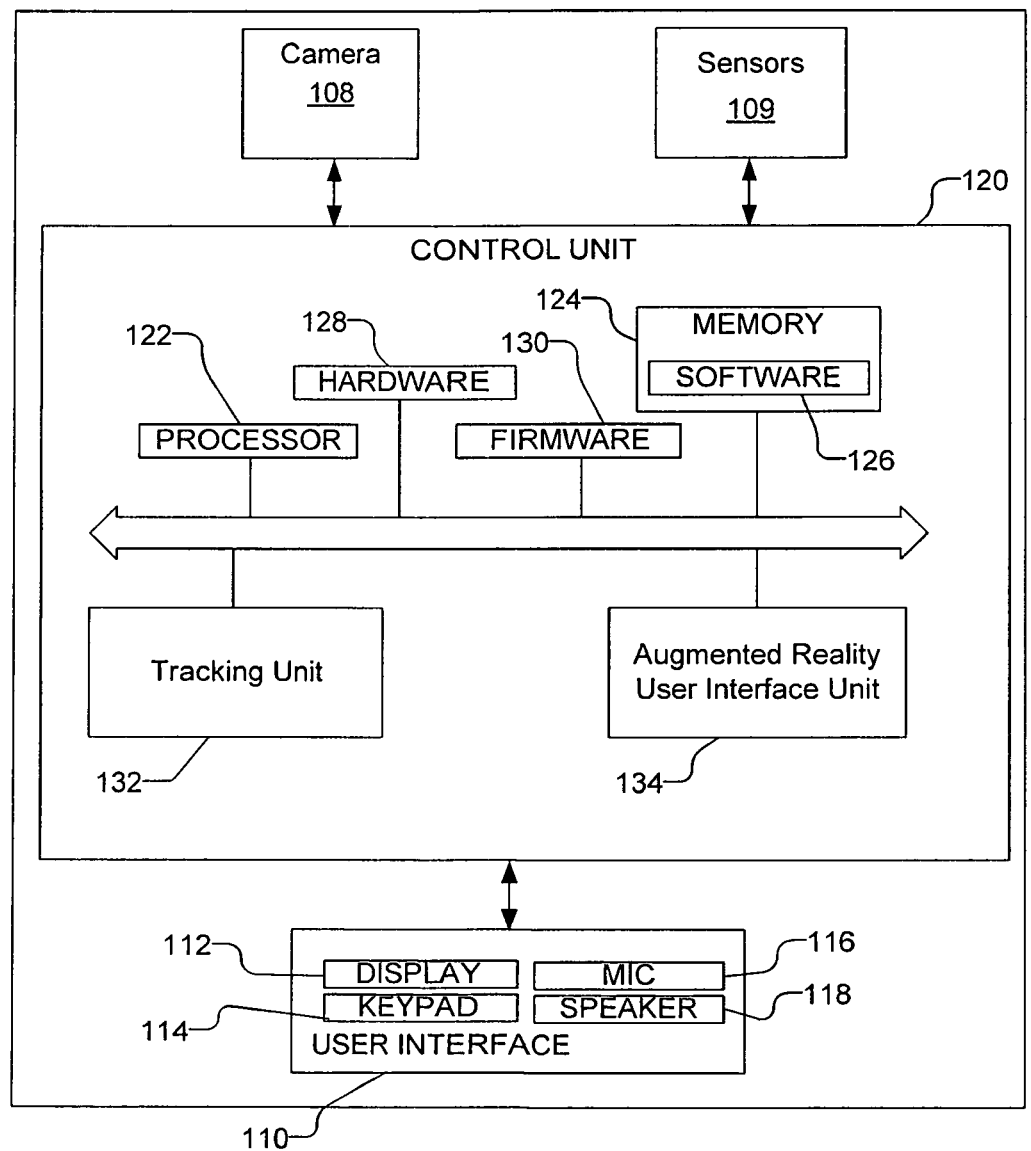
FIG. 2 illustrates a block diagram of an exemplary augmented reality enabled device according to some aspects of the present disclosure.

FIG. 2 illustrates a block diagram of an exemplary augmented reality enabled device according to some aspects of the present disclosure. The mobile platform of the ARD 14 includes a camera 108 for capturing images of the environment, which may be either individual photos or frames of video. The mobile platform of the ARD 14 may also include sensors 109, which may be used to provide data with which the mobile platform of the ARD 14 can determine its position and orientation, i.e., pose. Examples of sensors that may be used with the mobile platform of the ARD 14 include accelerometers, quartz sensors, gyros, micro-electromechanical system (MEMS) sensors used as linear accelerometers, as well as magnetometers.

The mobile platform of the ARD 14 may also include a user interface 110 that includes display 112 capable of displaying images. The user interface 110 may also include a keypad 114 or other input device through which the user can input information into the mobile platform of the ARD 14. If desired, the keypad 114 may be obviated by integrating a virtual keypad into the display 112 with a touch sensor. The user interface 110 may also include a microphone 116 and one or more speakers 118, for example, if the mobile platform is a cellular telephone. Of course, mobile platform of the ARD 14 may include other components unrelated to the present disclosure.

The mobile platform of the ARD 14 further includes a control unit 120 that can be connected to and communicates with the camera 108 and sensors 109, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a tracking unit 132 configured to track the position of the ARD 14 as well as to track positions of one or more objects monitored by the ARD 14. The control unit 120 may further include augmented reality user interface unit 134 configured to present augmented reality interactions on the display 112 of the ARD 14. The tracking unit 132 and augmented reality user interface unit 134 are illustrated separately from processor 122 and/or hardware 128 for clarity, but may be combined and/or implemented in the processor 122 and/or hardware 128 based on instructions in the software 126 and the firmware 130.

According to aspects of the present disclosure, the ARD 14 may be used in conjunction with one or more tangible interface items. In many of the examples described herein, the tangible interface items are referred to as "objects" or "toys." However, other types of tangible objects may also be used and the techniques disclosed herein are not limited to toys. For example, the tangible interface items may include one or more items in the user's environment, such as a cola can, a coffee cup, a magazine, or other tangible item that may be within the field of view of the camera of the ARD 14.

The augmentation provided by the ARD 14 can form a continuous story path. Such a continuous story path may be referred to herein as a "scene." The augmentation logic of the ARD 14 can be configured to monitor the attentiveness of a user and to change scenes if it appears that the user has lost interest in a particular scene. Techniques for interacting with the user and for tailoring the augmentation content provided by the ARD 14 are described in greater detail below.

Figure 3:
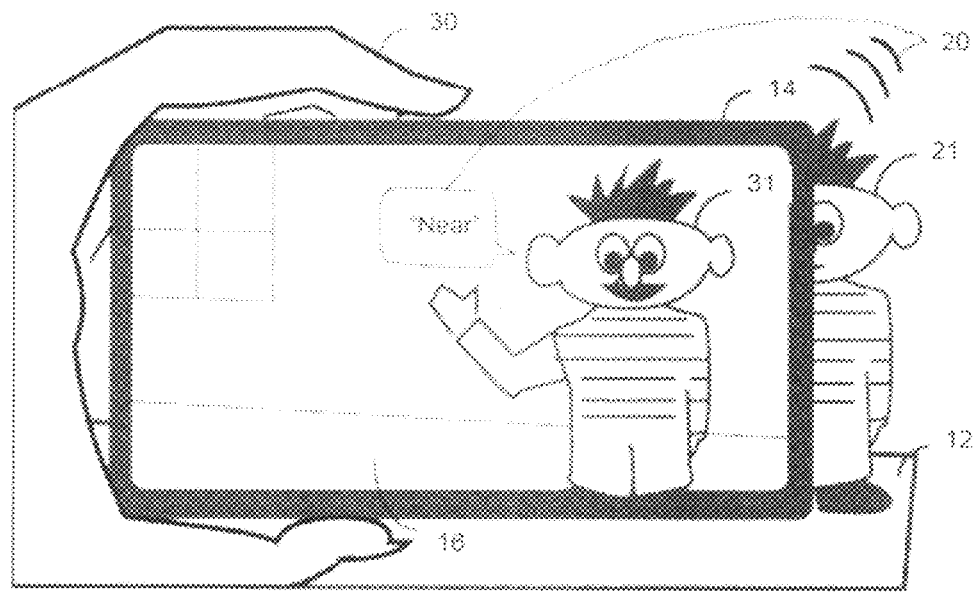
FIG. 3 illustrates a method of providing interactions based at least in part on relative position between an object and the ARD according to some aspects of the present disclosure.

According to embodiments of the present disclosure, there are numerous ways to trigger different augmentations by moving the ARD 14 and/or the object to different relative positions. In the example shown in FIG. 3, an augmentation may be triggered by moving the ARD 14 toward the tangible object 21 (also referred to as Bernie 21). The augmented virtual character 31 (also referred to as augmented Bernie 31) may say "near" (represented by audio 20) in response to the ARD 14 being moved closer to the tangible object 21. Similarly, in another exemplary situation, an augmentation may be triggered by moving the ARD 14 away from the object 21. The augmented virtual character 31 may say "far" in response to the ARD 14 being moved further from the object 21. For another example, an augmentation may be triggered by moving the ARD 14 from near one object to near another object, without zooming out and then zooming in (or moving away and then moving in). The augmented virtual character 31 can wave its hand in response to the ARD 14 puts the object in view of its display.

For yet another example, an augmentation may be triggered by moving far first and then moving towards an object from a previous scene. Similarly, the augmented virtual character 31 can wave its hand in response to the ARD moves towards the object 21. In other approaches, various augmentations may be triggered by changing geometrical relationship between the ARD 14 and an object, such as object 21. In yet other approaches, various augmentations may be triggered based on a combination of factors, such as distance between the ARD 14 and the object, and amount of time the ARD 14 and the object 21 stays substantially stationery relative to one another.

In the examples shown above, exploration using the ARD may be encouraged. A user may be rewarded with different augmentations for moving closer to or further away from the object(s). The user may perform this action by holding the device with one hand, thus freeing the second hand to remain engaged in the tangible play.

According to embodiments of the present disclosure, augmentation may change in response to the ARD 14 zooms in on an object 21. The zoom function may be accomplished by moving the ARD 14 closer to the object 21. The zoom function may also be accomplished by moving the object 21 closer to the ARD 14. Alternatively, the zoom function may be accomplished by performing software and/or hardware adjustment of views of the object 21 in the display of the ARD 14.

Figure 4:
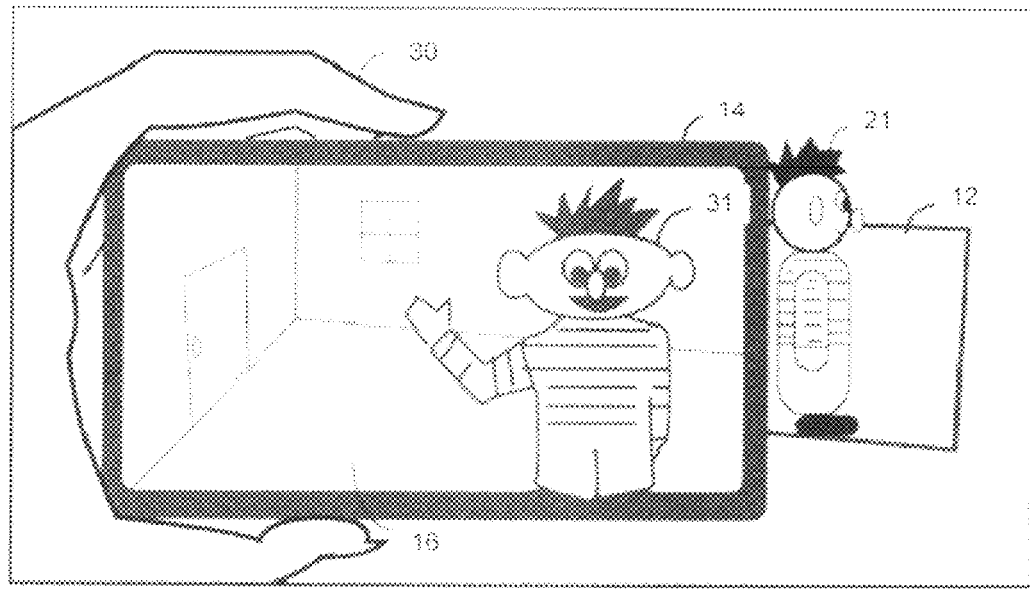
FIG. 4 illustrates a method of having a virtual character taking primary focus in an interaction according to some aspects of the present disclosure.
Figure 5:
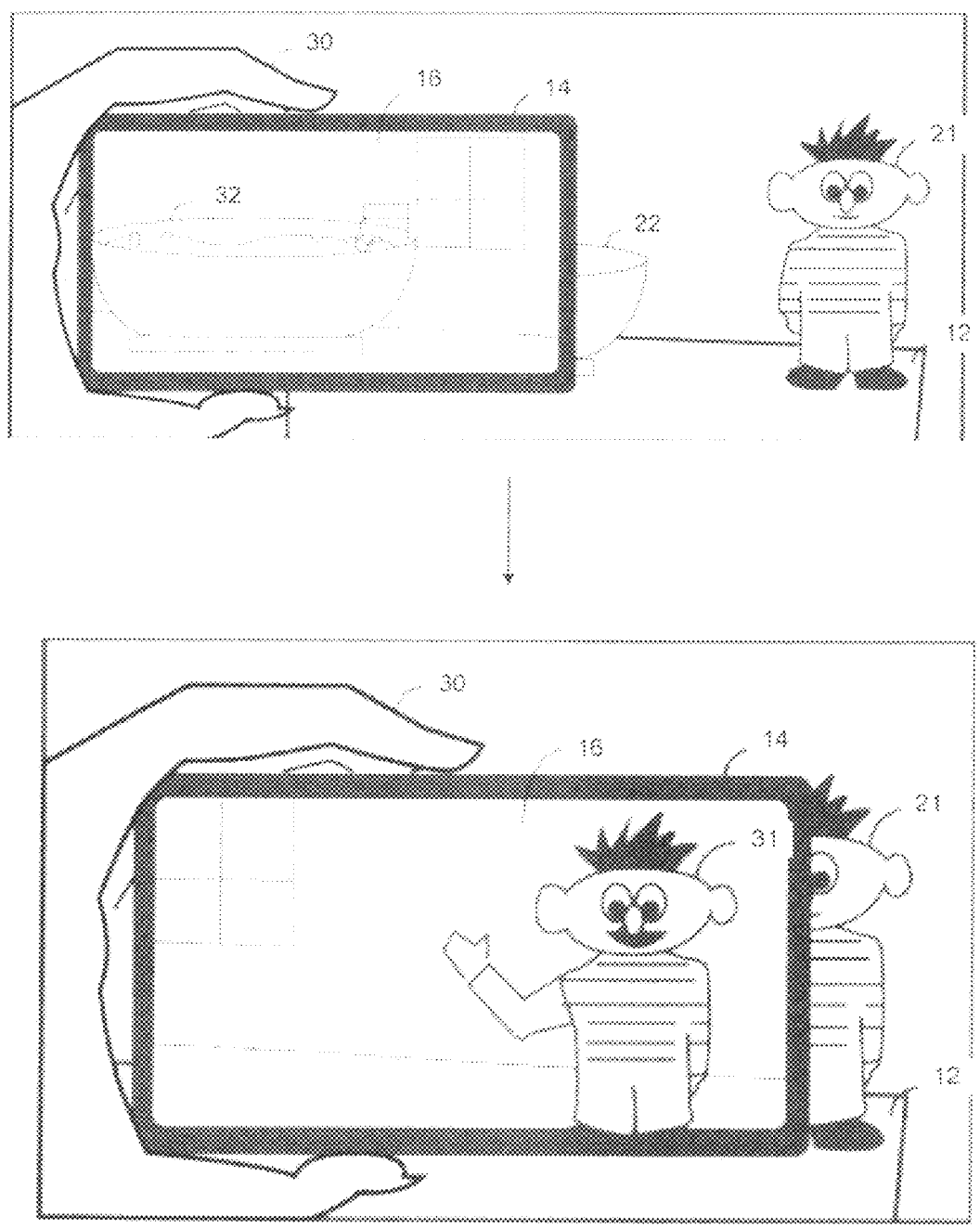
FIG. 5 illustrates yet another method of providing interactions based at least in part on movement between an object and the ARD according to some aspects of the present disclosure.

In various implementations, triggering augmentations may be represented as the augmentation of the object 21 on the ARD 14 screen takes primary focus, such as the virtual character 31, rotates to look in the direction of the ARD 14 as shown in FIG. 4. In another approach, the augmentation may change to having the virtual character 31, waves at the user. In yet another approach, the augmentation may change to having the virtual character 31, to say, "Hey, you!"

Figure 6:
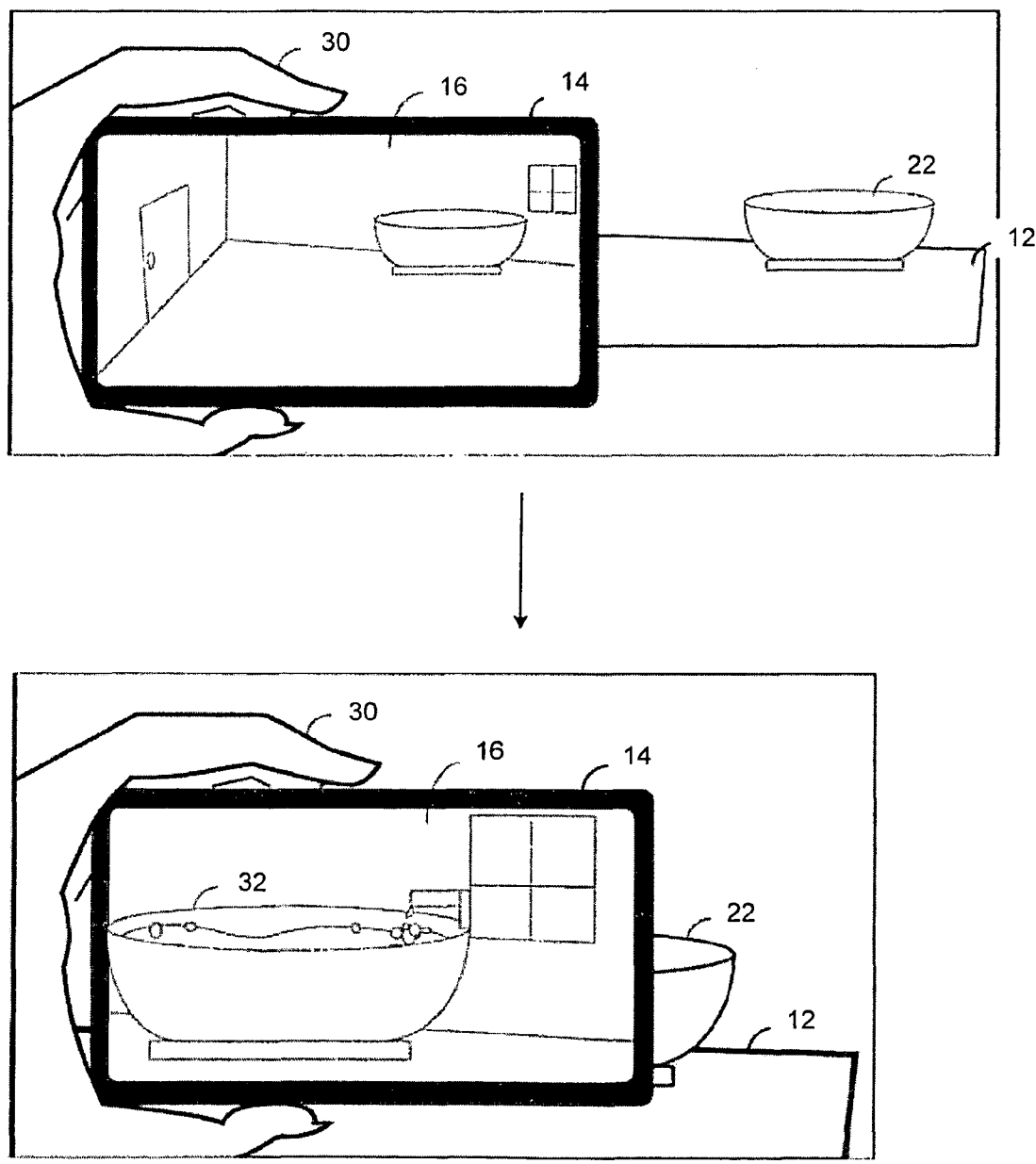
FIG. 6 illustrates a method of triggering augmentation based at least in part on an event according to some aspects of the present disclosure.

In yet other implementations, an event can be triggered according to change of geometrical relationship between the ARD 14 and the object 21. For example, when the ARD 14 zooms in on a TV and a video may start playing; or when the ARD 14 zooms in on a toilet and flowers may pop out. As shown in the example of FIG. 6, in response to the ARD 14 zooms in on a bath tub 22, an augmented bath tub 32 that fills with bubbles can be shown on the display of the ARD 14.

Figure 7:
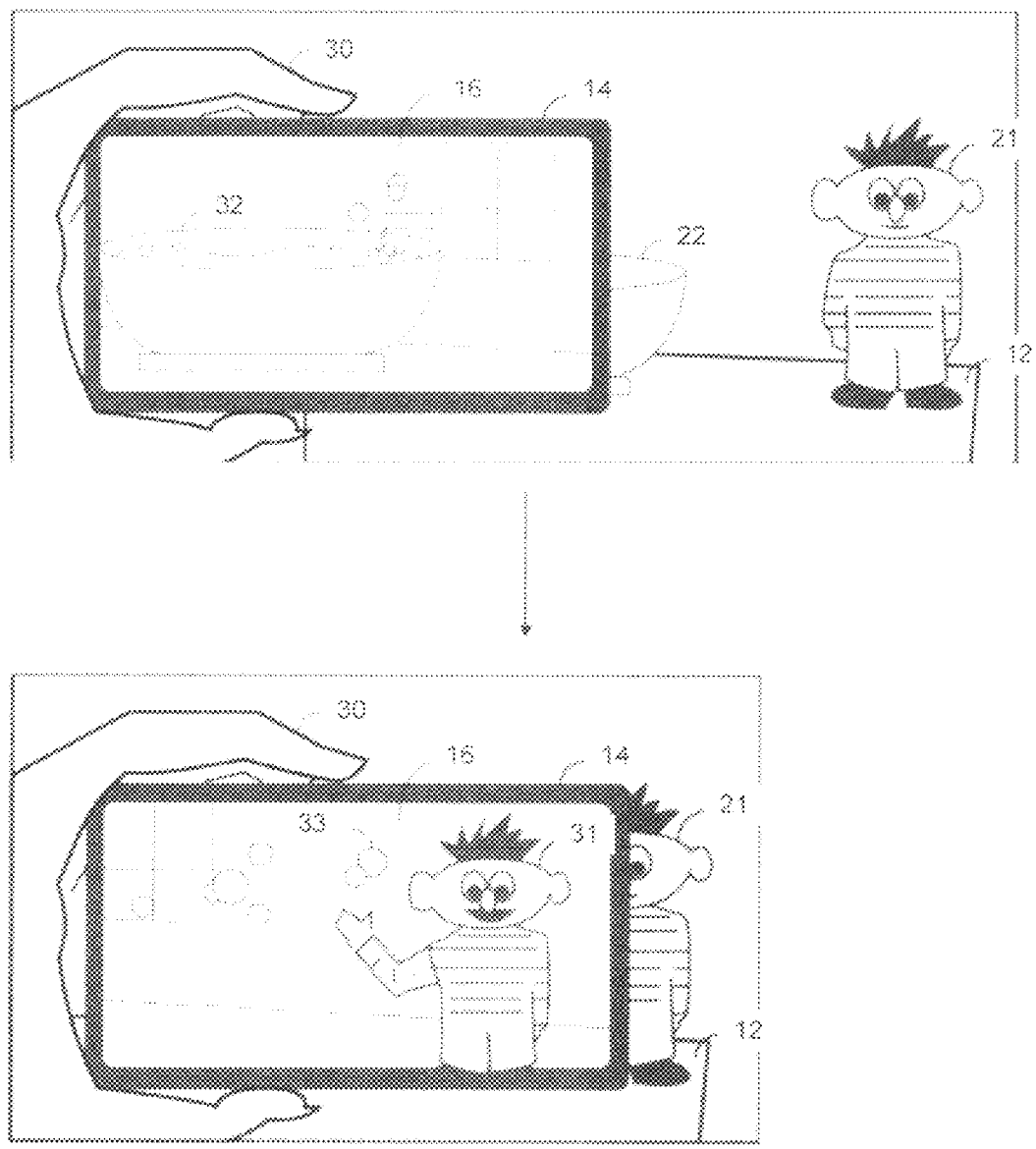
FIG. 7 illustrates a method of continue providing augmentation based at least in part on an object not in focus according to some aspects of the present disclosure.

The scene may change, with elements of unfocused objects being affected by the focus of an object. For example, if the ARD 14 zooms in on Bernie while he is having a discussion with Brett, an interaction with the user may be created by Brett saying "Hey Bernie, who do you have there?" For another example, if the ARD 14 zooms in on Bernie 21 who may be playing with the bathtub 22, the bath tub bubbling sound gets quieter, or bubbles 33 from the augmented bathtub 32 may float around the augmented Bernie 31 as illustrated in FIG. 7. For yet another example, augmentations of the background 12 (such as the floor) may be shown. In some embodiments, the resolution of an object or objects may be adjusted. For example, the resolution of a virtual painting may be adjusted based on a zoom or "position" of the ARD 14 with respect to the painting.

A scene may initiate actions based on aspects of the interaction. For example, the augmented Bernie 31 may say, "Near" and the user may respond by moving near, then the ARD 14 can be configured to reward the user by triggering new augmentations of having Bernie to say. "Good!" and/or having Bernie to perform a dance in response to the user following the instructions.

According to embodiments of the present disclosure, augmentation may change in response to the ARD 14 zooms out from the object 21. The zoom function may also be accomplished by moving the ARD 14 away from the object 21. Alternatively, the zoom function may be accomplished by using a zoom out function on the ARD 14, or by moving the object 21 further from the ARD 14.

Figure 8:
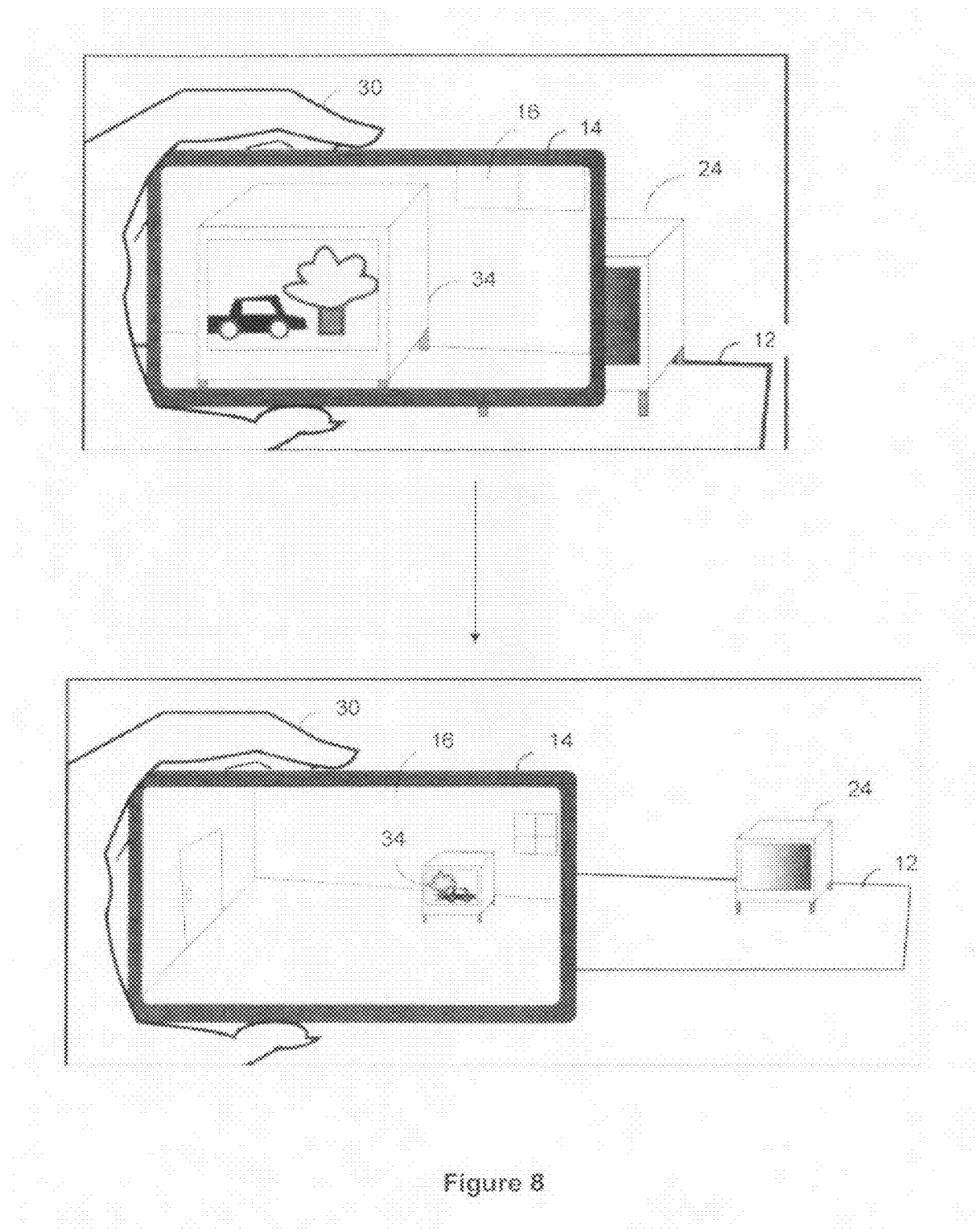
FIG. 8 illustrates a method of controlling interactive events based at least in part on view of an object from the ARD according to some aspects of the present disclosure.

In one approach, a triggered event may continue after the ARD 14 zooms out from the triggering object, for example the TV 24 as shown in FIG. 8. In other implementations, the triggered event may not continue after the ARD 14 zooms out. For example the TV 24 may go dark as the ARD 14 zooms out. In yet another approach, zooming out may end the scene, change the scene or resume a previous scene. For example an augmented Bernie 31 may stop looking at the user and goes back to watching TV. In yet another approach, the scene may continue based on aspects of the interaction. For example, the augmented Bernie 21 may say, "Far" and the scene may be adjusted to show the augmented Bernie being farther from the ARD 14.

In other implementations, when the ARD 14 is moved from a zoomed state on one object to a zoomed state on another object without first zooming out, a different or combined augmentation may occur. The movement may include but not limited to: 1) a lateral or rotational movement of the ARD 14; 2) a movement of one object out of the frame and a new object into the frame in close proximity to the ARD 14; and 3) an introduction of the new object in close proximity to the ARD 14 while the previous object may still be in the frame.

Figure 9:
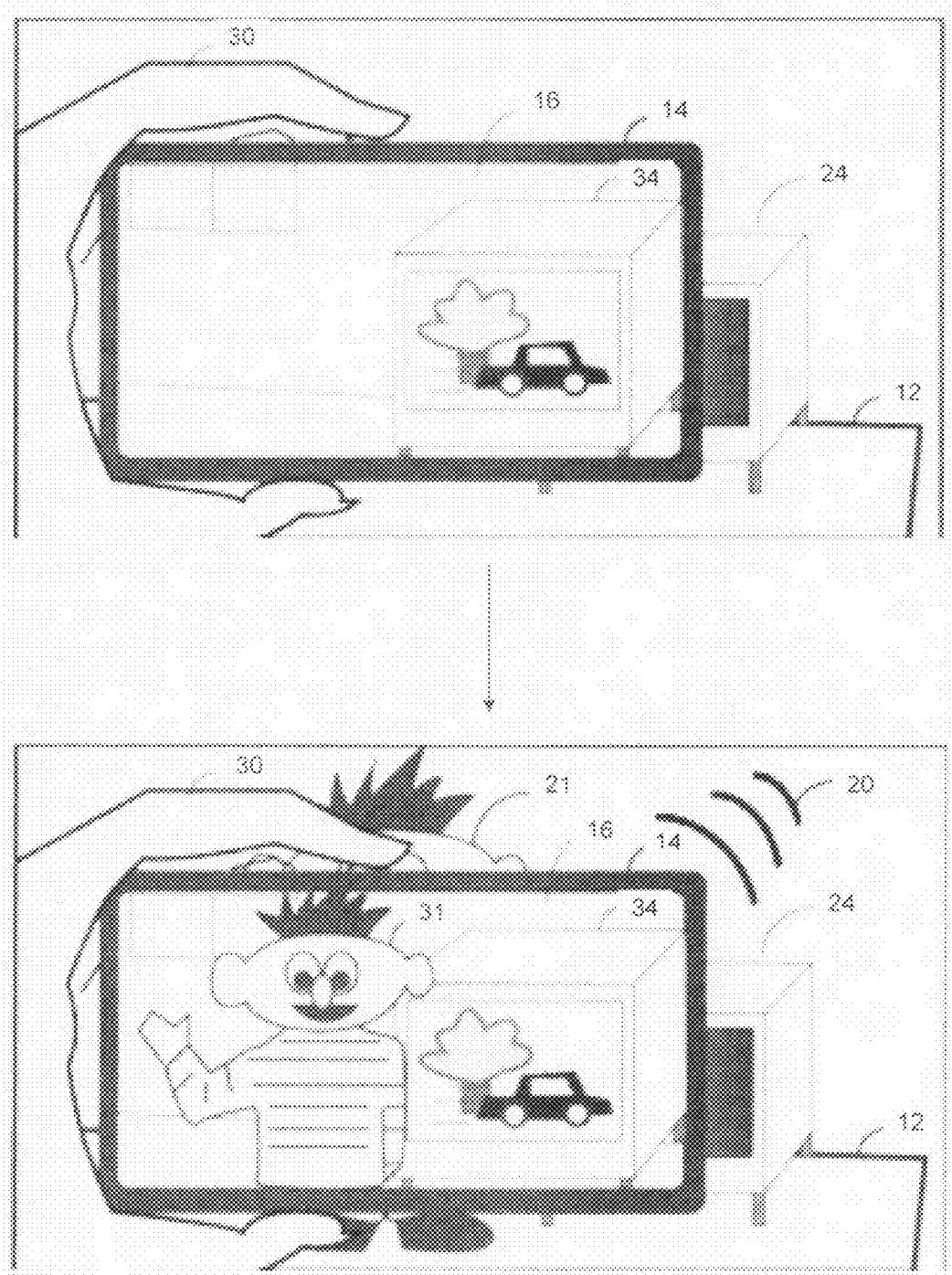
FIG. 9 illustrates yet another method of providing interactions based at least in part on addition of another object according to some aspects of the present disclosure.
Figure 10:
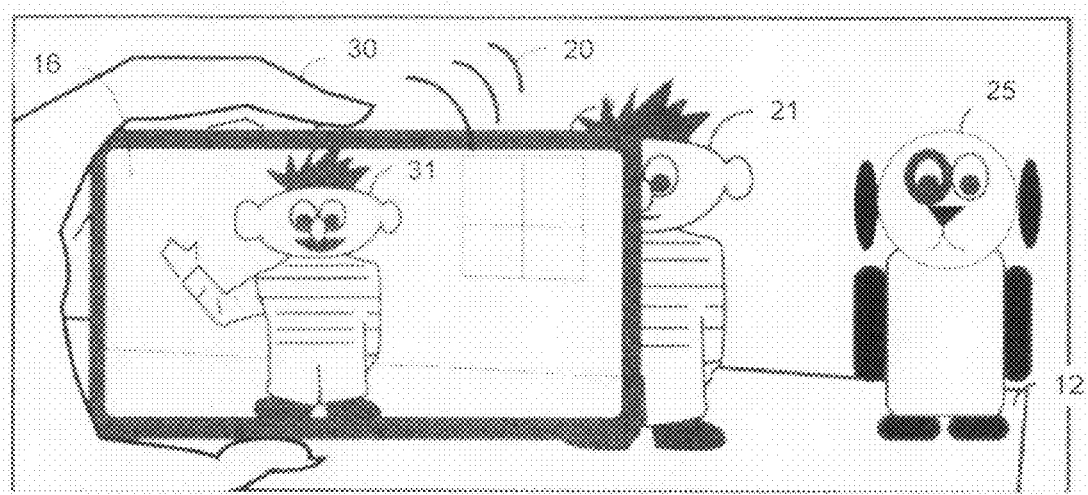
FIG. 10 illustrates yet another method of providing interactions based at least in part on addition of another character according to some aspects of the present disclosure.
Figure 10:
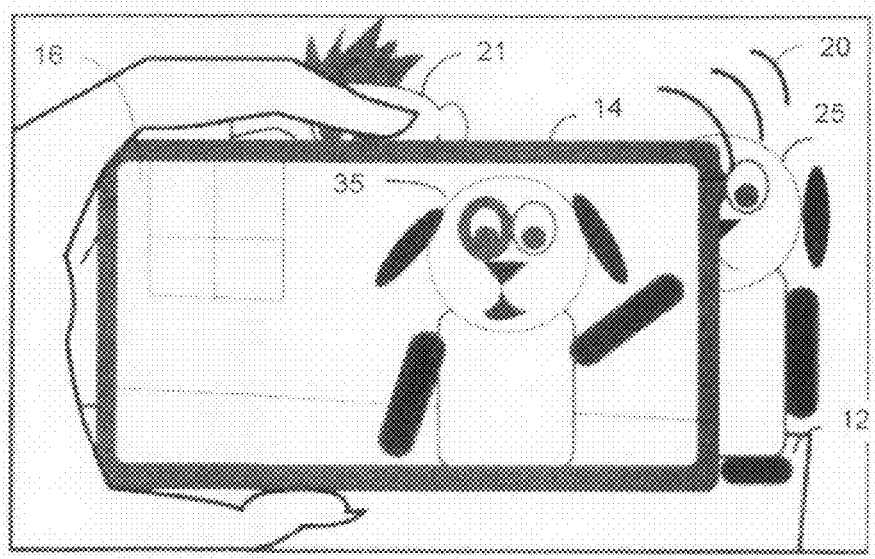

The different augmentation may be a continuation of the scene from the previous object zoom state. In one approach as shown in FIG. 9, while zoomed in on the TV 24, which a video being played in the virtual TV 34, then introducing Bernie 21 into the frame (with or without the TV 21 still in the frame) causes a virtual Bernie 31 to interact with the user by saying, "Oh, you are watching TV! Can I watch with you?" In another approach as shown in FIG. 10, when panning from being zoomed in on Bernie 21, which causes the virtual Bernie to say "Oh, it's you", to being zoomed in on Dog 25, and the virtual Dog 35 says, "Bernie's right, it is you!" (20).

In yet other implementations, after zooming out, the ARD 14 may zoom back in to the same object where the previous zoom out ended the scene without first zooming to another object. The scene may pick back up with different augmentation from the first time, for example Bernie may say, "Hey, there you are again!"

In yet other implementations, the scene may not pick back up, but instead may start a new scene in the following scenarios, including but not limited to: 1) if a time t has passed (e.g. 2 to 5 minutes); 2) if the ARD 14 detects a new user (e.g. through Galvanic Skin Response signature); 3) if the ARD 14 is set down in a certain way (e.g. screen down); or 4) if the ARD 14 is configured to explore different floors or different objects in zoomed out mode in the interim. Note that the new scene may be a repeat of the first zoom-state scene. For yet another example, the new scene may be a new representation of the virtual character, which may present a new experience to the user.

Figure 11:
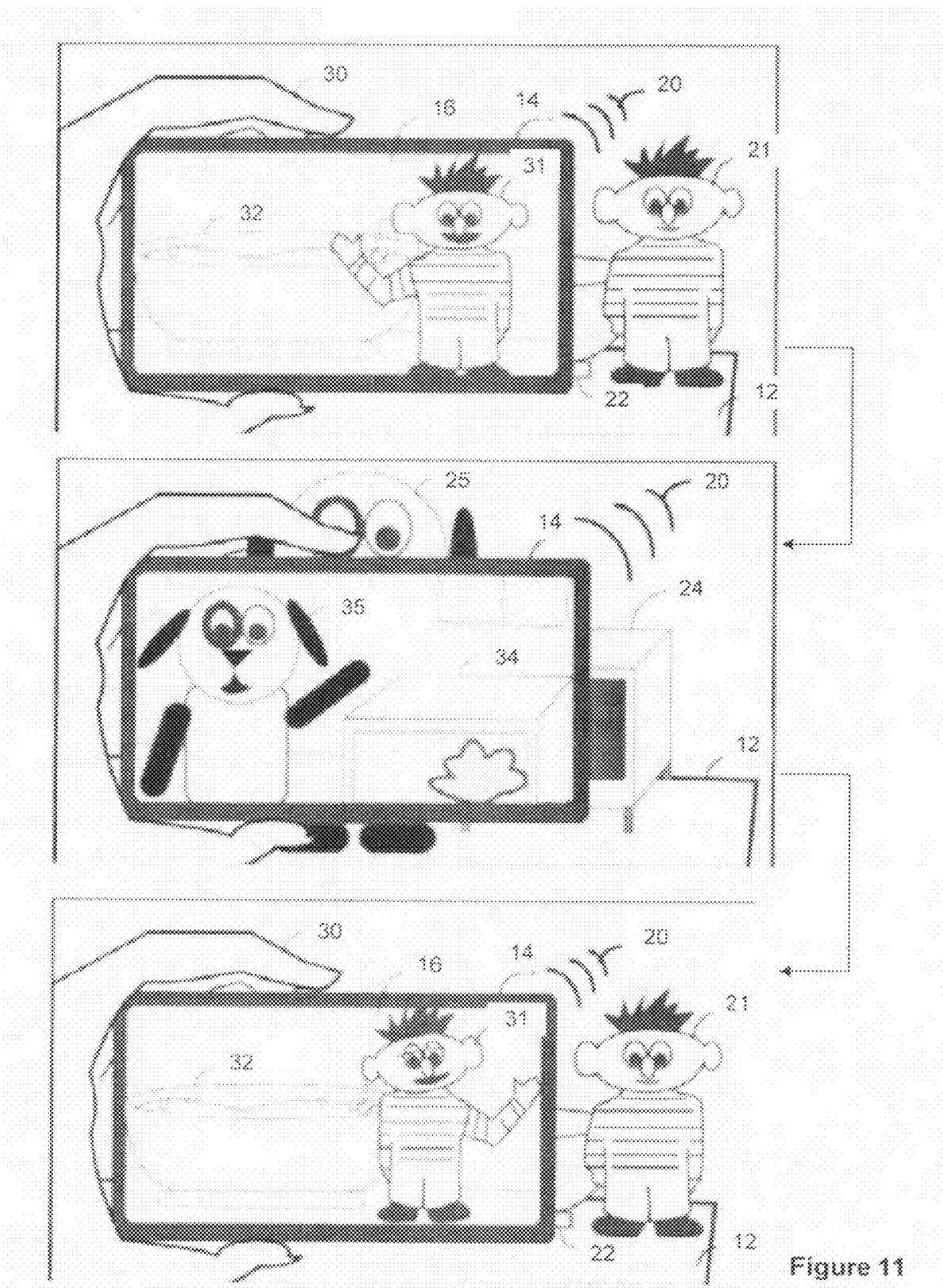
FIG. 11 illustrates yet another method of providing interactions based at least in part on a resumed scene according to some aspects of the present disclosure.

After zooming onto another object or exploring different areas or objects, the scene may pick back up with added storyline elements from the previous experience. In the example shown in FIG. 11, the scene moves from Bernie 21 to Dog 25 in a different room, then may return back to Bernie 21, and virtual Bernie 31 may interact with the user, for example by saying, "Oh, hey there! I am still taking a bath. Did you enjoy watching the TV show with Dog?"

Figure 12:
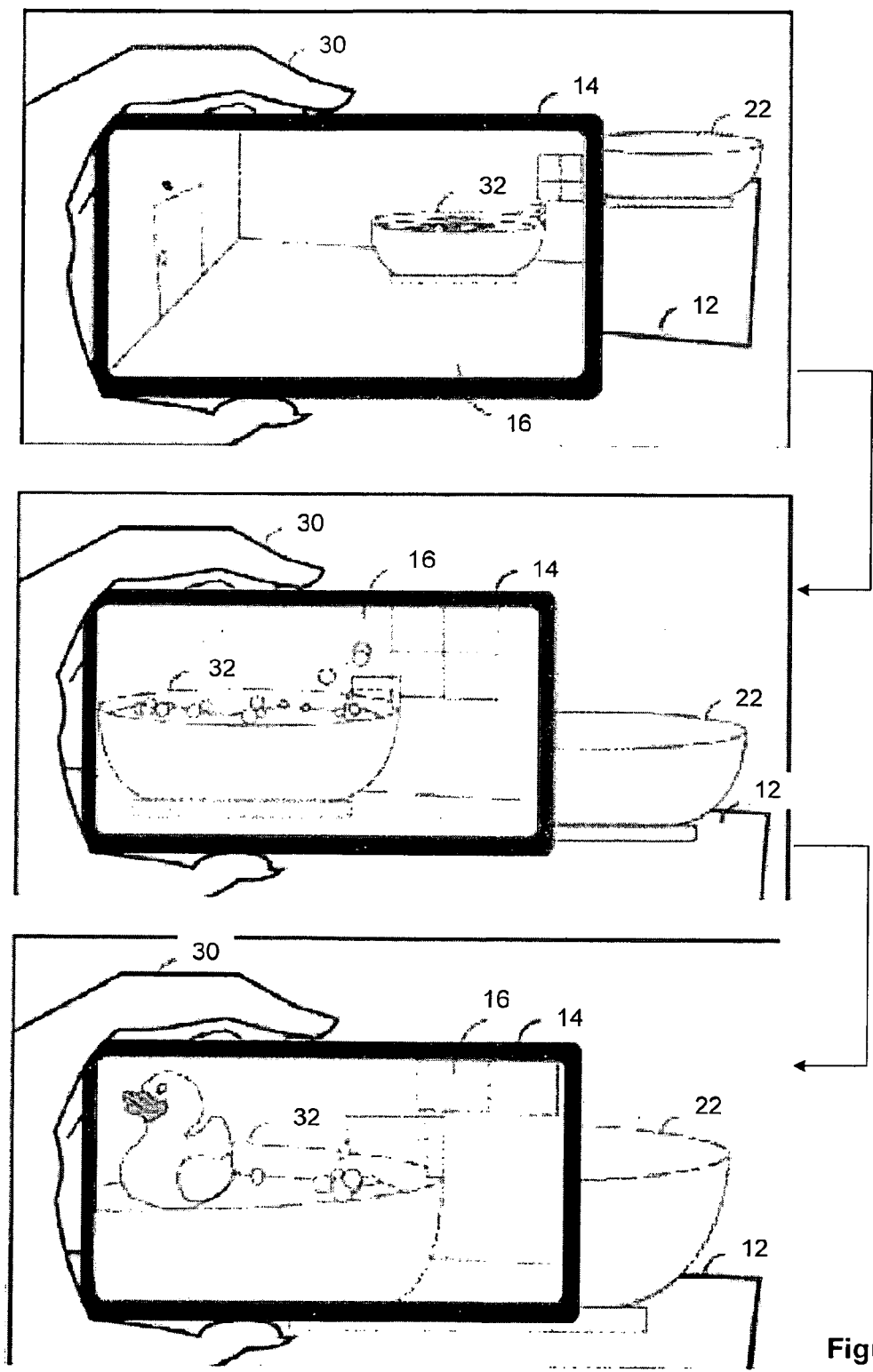
FIG. 12 illustrates a method of triggering interactions based at least in part on distance between an object and the ARD according to some aspects of the present disclosure.

In other implementations, as shown in FIG. 12, the augmentation 16 may be different depending on how close an object is (relative size of the object) from the ARD 14. The factors may include, but not limited to: 1) from a distance, the bathtub water swirls; 2) as the ARD 14 gets closer, bubbles start to appear; and 3) as the ARD 14 gets even closer, an augmented Rubber Duck may pops up.

According to embodiments of the present disclosure, the ARD 14 can be configured to use target positional state as triggers of augmentation. For example, the ARD 14 can be configured to support 2×6 degrees of relative position interaction of device and 3D markers. The ARD 14 may be moved to any location relative to an object and the object may be moved to any position relive to the ARD 14, or they both can be moved together with respect to each other. To encourage and reward the full range of exploration and augmentation, each position and/or movement can trigger different augmented interactions. Note that the position and/or motion may be categorized relative to a reference background 12, such as the floor.

Figure 13:
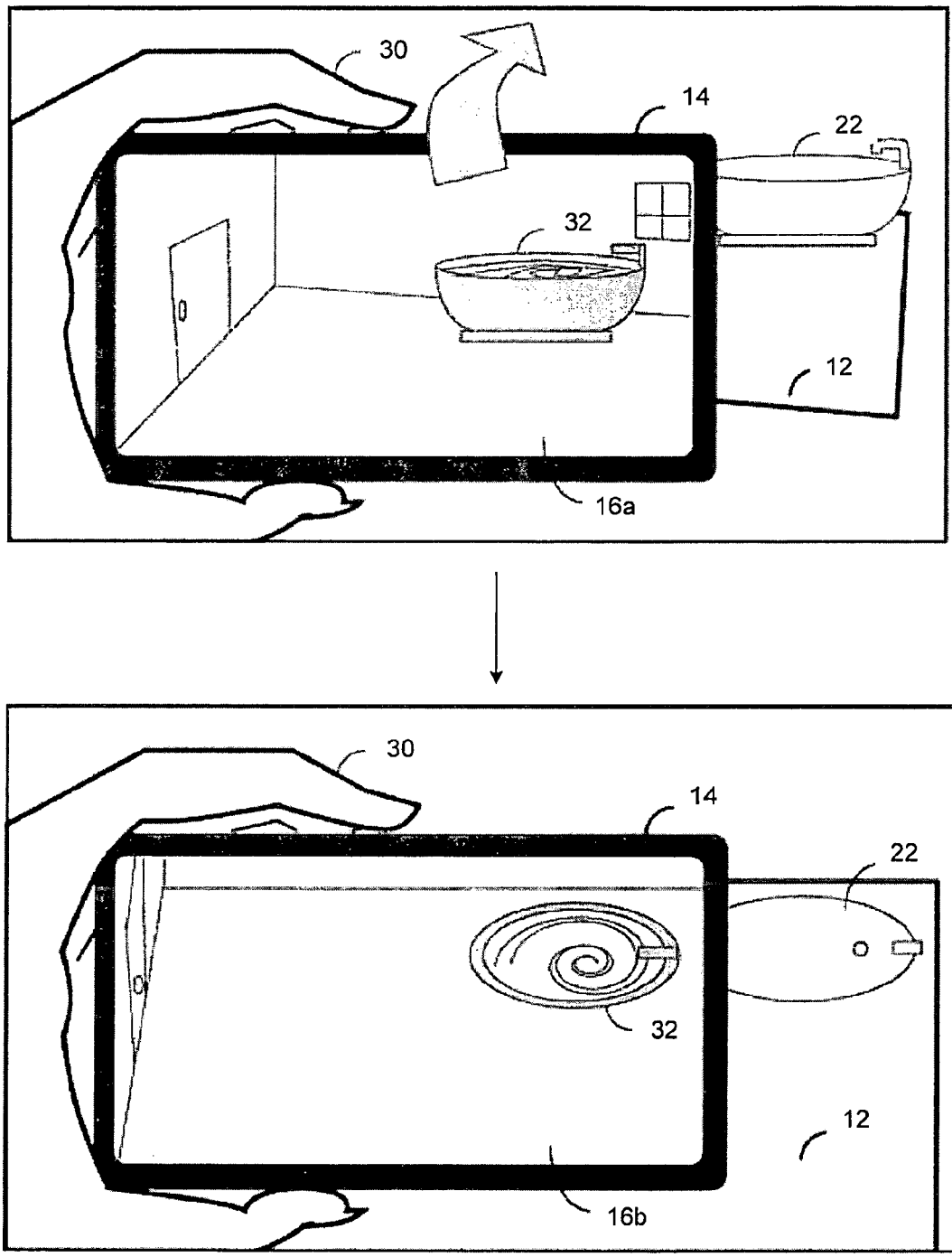
FIG. 13 illustrates a method of triggering interactions based at least in part on movement of an object and the ARD according to some aspects of the present disclosure.

As illustrated in FIG. 13, the ARD 14 may move relative to object, which may be placed on a reference background 12. The augmented image may change while the relative position of the object being tracked with respect to the floor 12 may not change. The floor 12 can be used to determine which item may be moving, such as the ARD 14, the object, or a combination of the both the ARD 14 and the object may be in motion. For example, the object may move relative to the ARD 14. For another example, the object may be placed on the reference floor 12, and the augmented image may change in the view of the ARD 14 while the relative position of the object being tracked with respect to the floor 12 changes.

For yet another example, both the ARD 14 and the object may move relative to each other. In this example, the object may be placed on a reference floor 12, and the augmented image may change in the view of the ARD 14 while the relative position of the object being tracked with the reference floor has some change that may be less than the change observed by the ARD 14.

For yet another example, the ARD 14 and the object may maintain position relative to each other, but their position may change with respect to the floor 12. For example, the object and the ARD 14 may be picked up and be moved together outside the play floor area, thus the augmented image of the object may not change in the view of the ARD 14 while the relative position of the object being tracked with respect to the floor 12 has been change. Note that the relative position and/or relative motion between the ARD 14 and the object may be categorized by monitoring the change in distance between them without tracking whether the ARD 14 or the object has moved. According to aspects of the present disclosure, each of the categorizations may trigger different augmentations.

Figure 14:
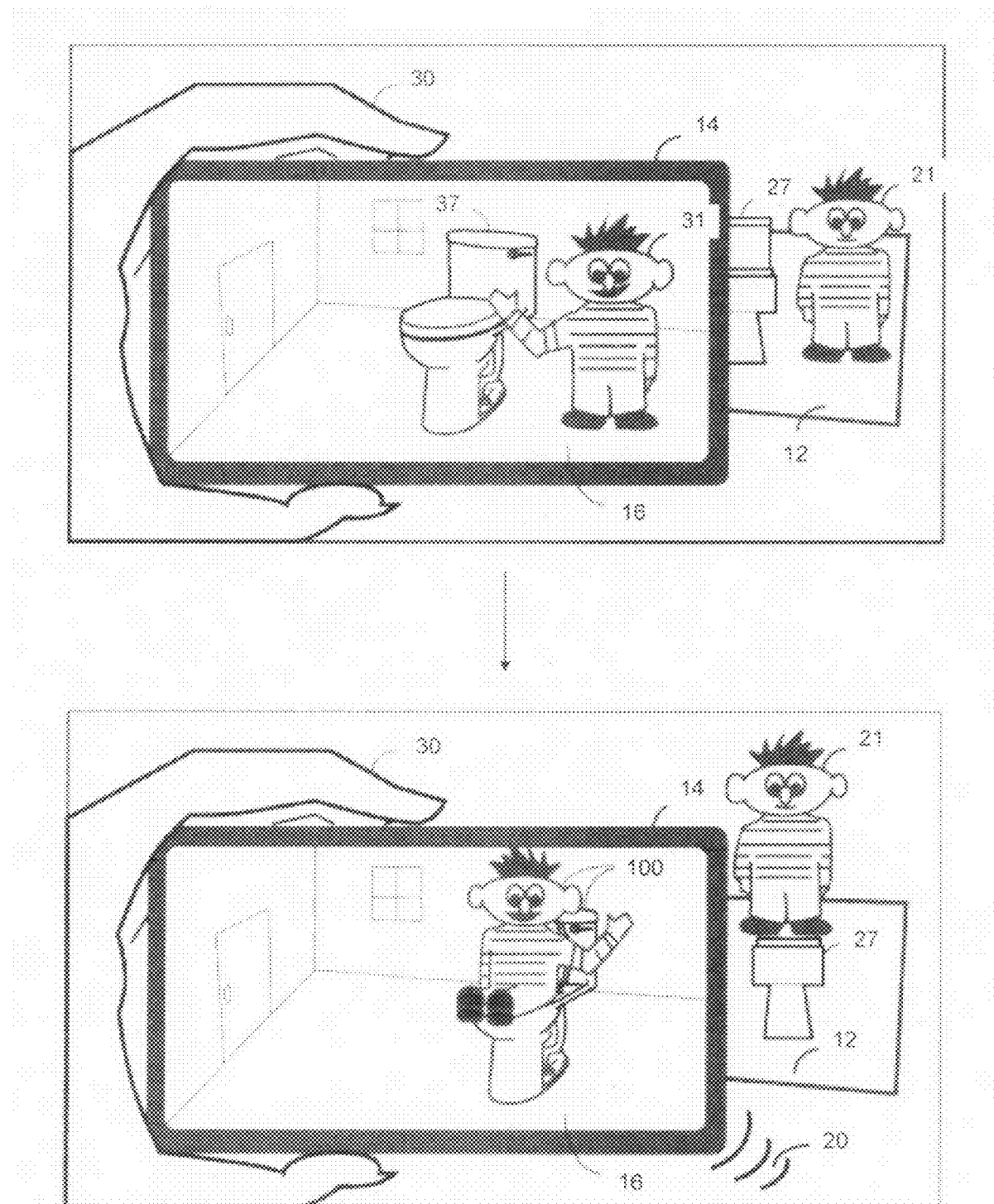
FIG. 14 illustrates a method of providing interactions based at least in part on object-on-object according to some aspects of the present disclosure.

In some implementations, as shown in FIG. 14, the ARD 14 can be configured to support object-on-object interactions. If an object is placed on another object, this action or the resulting state can trigger an augmentation. For example, if the ARD 14 observes Bernie 21 being placed on a toilet 27, an augmented Bernie 31 may say, "I take a break when I need to go potty." In addition, stacking multiple objects may trigger a new augmented object to be created. For example, stacking Bernie 21 on the toilet 27 may cause a new combined augmentation 100 of the augmented Bernie 31 sitting on top of the augmented toilet 37. For another example, stacking blocks to form the shape of a car may trigger an augmentation of a car. The user can keep the augmentation that has been created even after the blocks may no longer be in view in the event that the blocks may be used to create a new form.

In another approach, the ARD 14 can be configured to support object-beside-object interactions. Objects placed next to each other can trigger a new augmented object to be created. For example, blocks being placed beside each other can trigger an augmented video screen to be overlaid on them. Also, more blocks may be added to make the screen bigger. The relative orientation of the objects can trigger different augmentations. For example, having Bernie facing Burt can trigger an augmentation of characters greeting each other; while having Bernie behind Burt can trigger an augmentation of Burt startled when Bernie talks.

In yet another approach, the ARD 14 can be configured to support object-above-object or object-below-object interactions. When an object is placed above another object, this action can trigger augmentation. For example, if a water can is held over a flower pot, it can trigger an augmentation of a flower growing from the pot. For another example, if a piano is being augmented with a tune being played on the piano, the user can hold the piano above a guitar to trigger a song augmentation that includes sound from both the piano and the guitar.

In other implementations, the ARD 14 can be configured to cause augmentations to be triggered by an action or an orientation together with a position. For example, if a piano is tipped over above a guitar in a "pouring" motion, the augmentation may "pours" the tune from the piano into the guitar such that the piano may stop playing and the guitar may pick up the tune. Note that "pouring" can be done in different amounts. For example, when a keyboard is tipped a bit over a guitar, and then over a sousaphone, these actions may trigger an augmentation of some of the tune passing to each instrument.

In one approach, if the triggered augmentation persists, then the following scenes may be shown, including but not limited to: 1) the guitar "pours" over the soundboard triggering the augmentation of the guitar tune to play from the soundboard; 2) the user then moves the view of the ARD to the piano and performs an action that causes the piano to make a new tune; 3) the user then moves the piano over the soundboard (moving the view to see the piano and soundboard), the soundboard may still be playing the guitar tune; 4) the piano "pours" over the soundboard triggering the augmentation of the piano tune to be added to the guitar tune playing from the soundboard; or 5) the above can be repeated with other instruments, such as drums, guitar, etc., building a complex song on the soundboard.

In another approach, the augmentation may persist, causing the complex tune to be played continuously from the soundboard, until one or more of the following may be detected: 1) the user performs an action to stop the tune, e.g. shakes the soundboard to clear the tune, or "pours" the song into a trash can, or user chooses to save the song; 2) all instruments may have been out of the view of the ARD 14 for a predetermined period of time; or 3) the application is closed or the ARD 14 may be turned off.

In yet other implementations, the ARD 14 can be configured to support object-in-object interactions. In this example, an object may be partially or fully contained in another object, which may create a new state that may trigger specific interactions. In one scenario, a partial-in state on a partial-in only state object can trigger augmentations. For example, when Bernie is placed into a bathtub, an augmentation may be triggered to show him taking a bath.

In another scenario, a partial-in state on a multi-in state object can trigger augmentation. For example, a car may be large enough for Bernie to fit inside completely, such as entering though one or more doors. Each different stage of Bernie entering the car can represent a state that can trigger an augmentation. For another example, Bernie occludes the open passenger's side door (or opening) of the car at a scale relative to the scale of the car as observed by the ARD, thus indicating Bernie is near or in the plain view of the car, an augmented Bernie may say "I'm getting in the car." For yet another example, Bernie may occupy a place on the floor that may be adjacent or collocated with a place on the floor of the driver's side door (or opening) as observed by the ARD 14, in that scenario, the augmented Bernie may say, "I am going for a drive."

In yet another scenario, a full-in state on a single or multi-in state object can trigger augmentation. When the occlusion is partial, for example when Bernie is inside the car, he can be seen through a window of the car, this can trigger an augmentation of a sound and of car engine starting and an interaction with the user may be performed by the virtual Bernie saying, "Yay, here I go!" When the occlusion is full, for example when the ARD 14 can see Bernie more than half way in the car, then the car door is shut and Bernie is not visible, the scene flow continues with the state of Bernie being inside the car. This can trigger the sound of car engine starting and the virtual Bernie may say, "Yay, here I go!"

In yet another scenario, an object-in-object state can affect augmentation of the outer object. If Bernie is known to be in a state of "in-car" (inside of a car), then an augmentation can be triggered to have Bernie driving the car, with or without being able to observe Bernie in the car in the real world. In yet another scenario, an outer object can affect augmentation of the object-in-object state. If Bernie is known to be in a state of "in-car", then an augmentation can be triggered to have Bernie in a driving cap and driving gloves. The augmentation ends when Bernie exits the in-car state, for example he is no longer wearing his hat. In other scenarios, the augmentation may persist after the in-car state is ended.

In yet another scenario, persistence of scene with occlusion may occur when a first object is seen in a second object. For example, if Bernie is seen through the windows of a car, then Bernie is occluded. If the ARD 14 moves above the car and cannot see Bernie through the roof, then the scene may continue with the state of Bernie is assumed to be in the car (first object still in second object), until 1) the car is observed from an angle where Bernie can be observable but he is not there anymore; 2) Bernie is seen exiting the car; 3) Bernie is seen elsewhere; 4) an amount of time has passed without the car being in the view of the ARD 14; 5) the ARD 14 has been placed down for an amount of time t2 (for example 1 minute); or 6) the ARD 14 has been placed down and has been picked up by another user, which may be detected by checking a maximum height deviation from the floor, or via methods such as bio-identity checkers (such as GSR), heart rhythm, face recognition, finger print, or any combination thereof. Note that persistence of scene with occlusion may occur when the first object is seen in a state of entering the second object, where the second object may fully occlude the first object, for example Bernie may be in a car with no windows. In yet another scenario, an object-over state may be achieved by placing an object over the top of another object. This state may trigger the same or different augmentation as the object-in state. For example, an object can physically be able to cover another object, such as a toy character can be put in a phone booth, covering him partially or fully.

Figure 15:
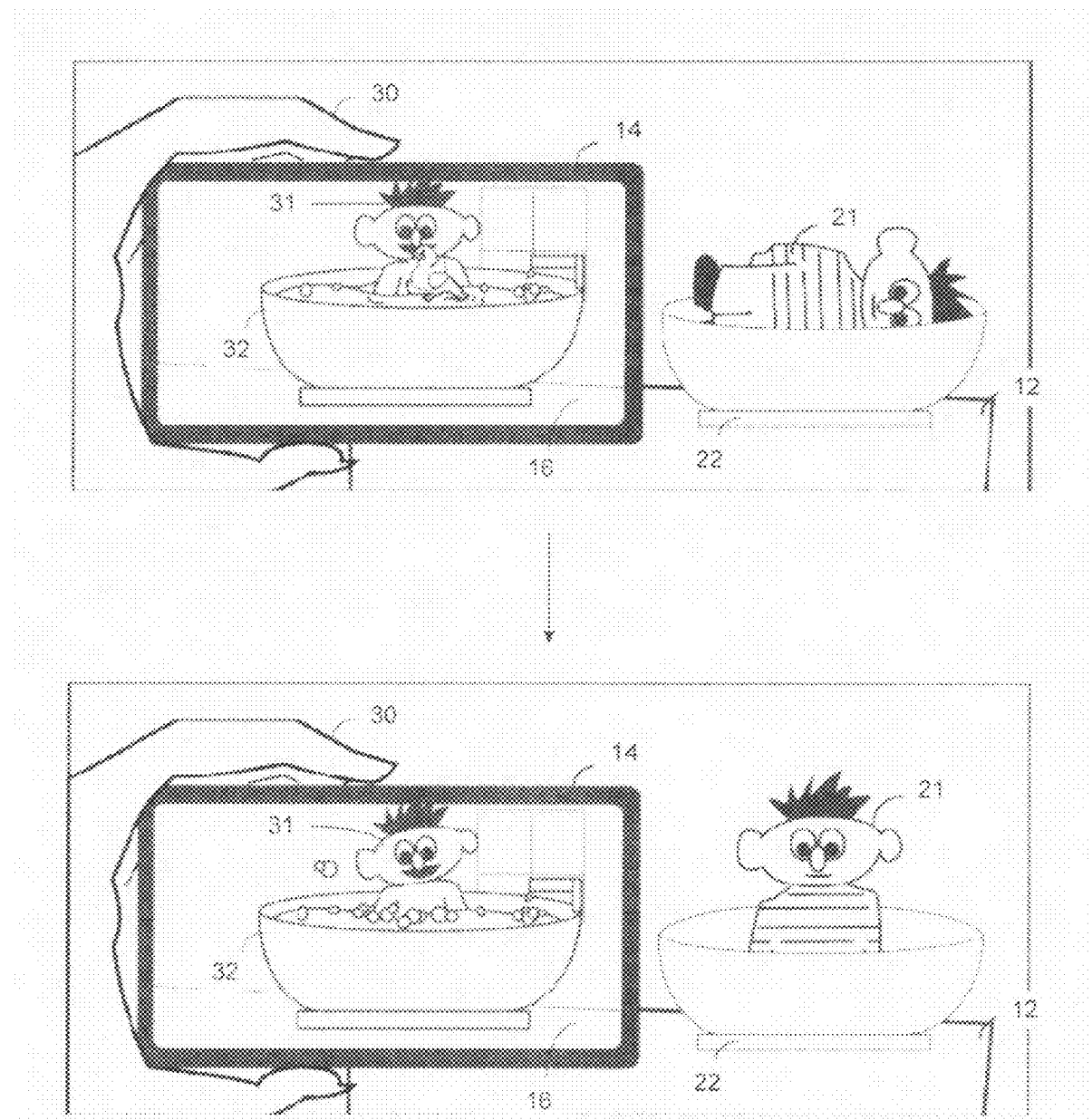
FIG. 15 illustrates yet another method of providing interactions based at least in part on relative orientation of object-in-object according to some aspects of the present disclosure.

As shown in FIG. 15, relative orientations between objects can trigger different augmentations. In this example, two or more objects can have multiple orientations or alignments relative to each other, and different orientations can trigger different augmentations. For example, when Bernie 21 is placed in the bathtub 22, an augmented Bernie 31 can be shown splashing water and making bubbles. For another example, when Bernie 21 lies down in the bathtub 22, an augmented Bernie 31 can be shown singing a bath time song.

Figure 16:
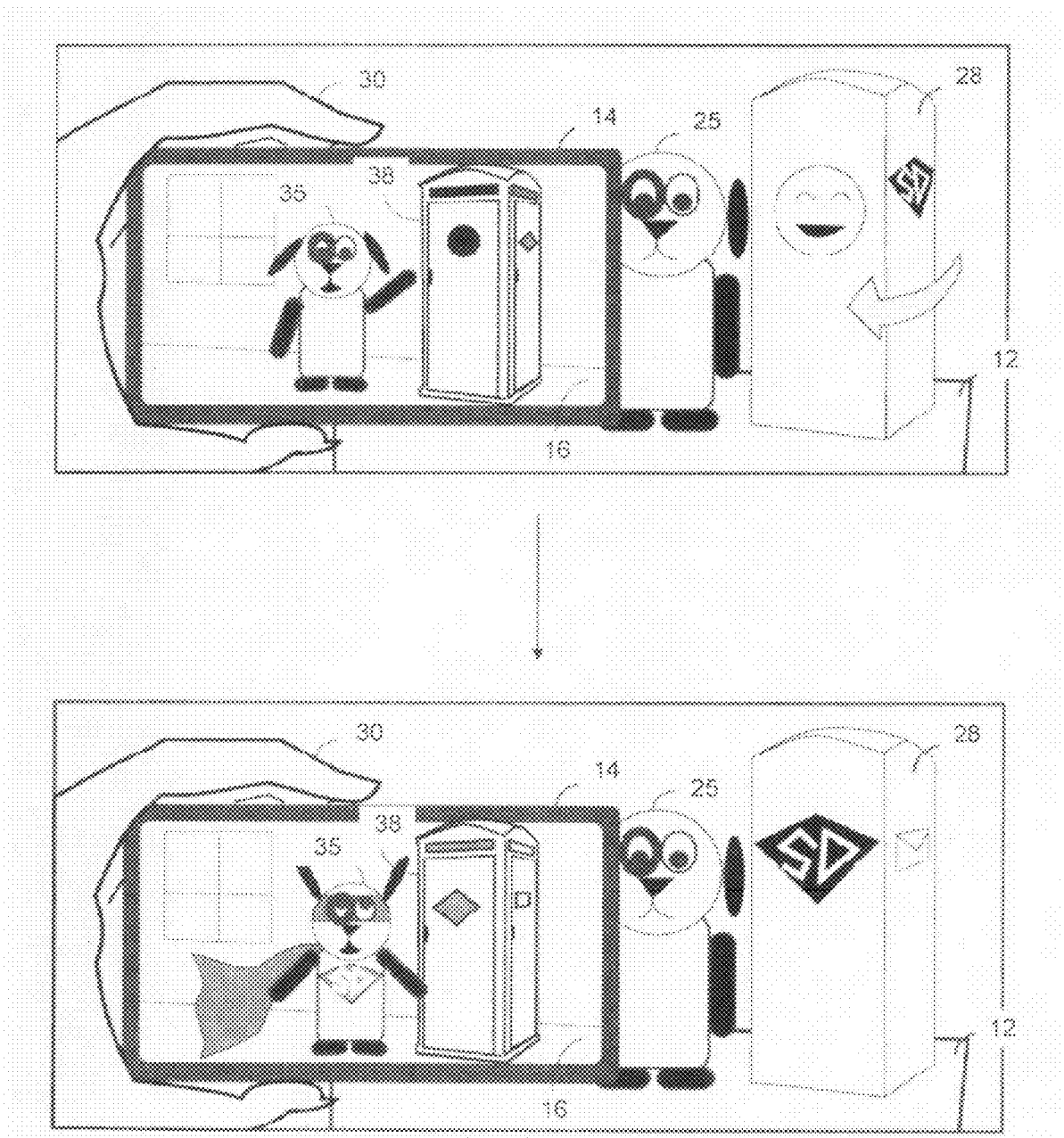
FIG. 16 illustrates a method of providing augmentation of an object based at least in part on orientation of another object according to some aspects of the present disclosure.

As shown in FIG. 16, orientation of an object may affect state of another object. In the case where an object affects the augmentation of another object, the orientation of the first object can determine the augmentation of the second object. For example, Dog 25 may be placed in a phone booth 28 where he may be completely obscured by the phone booth 28, or where he may be visible through the windows of the phone booth 28. The phone booth 28 may then be turned in any direction, such as 1) the phone booth 28 can move relative to the floor 12; 2) the phone booth 28 can move relative to the ARD 14; or 3) the ARD 14 can move relative to the phone booth 28.

In another approach, the orientation of the phone booth 28 may affect the augmentation of Dog 25, such that the augmented Dog 35 turns into Super Dog, Dog the Delivery Boy, or Baby Dog. Note that the augmentation can be seen through the augmented phone booth 38, or part thereof; the augmentation can also be seen after Dog 25 exits the phone booth 28; or the augmentation can be seen when Dog 25 may be both in and out of the phone booth 28.

In yet another approach, the augmentation may persist in one or more of the following situations, including but not limited to: a) while Dog 25 is in the phone booth 28; b) as Dog 25 exits the phone booth 28; c) while Dog 25 is within a predefined distance from the phone booth 28; d) for a period of time, where the period of time is after leaving the phone booth 28; e) until Dog 25 re-enters the phone booth 28 or goes for a drive in the car; f) where the augmentation compounds with additional augmentation, for example, if augmented Super Dog 38 may enter a car, then augmented Super Dog 38 may also wear a driver's cap and gloves; and g) throughout an extended scene until 1) an amount of time t1 (for example 2 minutes) has passed without Dog 25 being in the view of the ARD 14; 2) the ARD 14 has been placed down for an amount of time t2 (for example 1 minute); or 3) the ARD 14 has been placed down and has been picked up by another user, which can be detected by checking a maximum height deviation from the floor, or via methods such as bio-identity checkers (such as GSR), heart rhythm, face recognition, finger print or any combination thereof.

According to aspects of the present disclosure, object-behind-object (occlusion) interactions can trigger different augmentations. An object partially obscuring another object can trigger an action. For example, the scene of Bernie 21 being behind a TV 24 (i.e. Bernie 21 may be partially obscured by the TV 24) can trigger an augmented Bernie 31 to fix the TV 34 (not shown). Note that in some cases, there can be an effect on the augmentation of just one of the two objects, or on the augmentation of both objects, or a combined augmentation of the two objects.

In yet another approach, the movement of the ARD 14 relative to one or more objects can trigger augmentation as in the following examples. In an augmented game of battle between robots, if one of the robots is shot and broken, the ARD 14 may be configured to zoom in to the robot, and then the ARD 14 may be configured to be twisted around like a wrench to fix the robot. Alternatively, another action may be used to grab the robot, such as the robot may be touched on the touch screen, then the ARD 14 may be configured to be twisted around like a wrench to fix the robot. In addition, the ARD 14 may be translated in and out to refuel the robot; or a shaking motion may be applied to the ARD 14 to undo an action.

According to embodiments of the present disclosure, an object may be used as tangible adjustment for augmentation. An augmentation can have aspects that are adjustable, such as volume, brightness, content, etc. In some implementations, movement of an object can be used to change states as follows. In one approach, the object may change an aspect of its own state. For example, a radio in the view of the ARD may trigger augmentation of a song being played; spinning the radio may cause the volume of the radio to be increased or decreased.

In another approach, an object may change an aspect of another object's state such as twisting the phone booth 28 may change augmentation of Dog 25 as illustrated in FIG. 16. For example, placing Bernie 21 near a TV 24 can trigger an augmentation of a video being played on the augmented TV 34; spinning Bernie 25 can cause the channel on the TV 24 to be changed.

In yet another approach, multiple objects can affect the augmentation of themselves or the augmentation of other objects. For example, turning the augmented TV 34 can cause the channel of the TV 24 to be changed in the augmentation. In other implementations, turning Bernie 21 can cause the volume to be adjusted, and turning another object can cause the brightness of the TV 24 to be adjusted.

In yet other implementations, position of an object can affect the augmentation of itself or the augmentation of other objects. For example, the volume of an augmented radio can be controlled by moving the augmented radio up and down, pulling it forward, and/or pushing it backward. The position of the radio can be observed relative to the floor, the ARD 14, or another object.

According to embodiments of the present disclosure, gestures of an object may be used as triggers of augmentations. An object may be moved in a natural play gesture to trigger an associated augmentation. For example, tilting a watering can over a flower pot can trigger an augmentation of watering the flower.

According to some aspects of the present disclosure, the following exemplary interactions may be implemented. including but not limited to: 1) an augmented Brett can ask Bernie a question, where a user can make Bernie nod or shake his head in response, providing an augmented positive or negative response accordingly; 2) moving a chess piece on a chess board can trigger an augmented wizard battle between the moved piece and the piece to be captured, with the moved piece winning the battle; 3) moving a book left or right rapidly can turn a virtual page of the book; and 4) tapping a guitar can set the rhythm of an augmented song.

According to embodiments of the present disclosure, gestures of an object may be used as scene creation. A user can be encouraged to play in the real world. For example, a user can move objects in a natural play gestures to trigger self-created scene progression as follows, including but not limited to; 1) if the user makes a character nod his head, the augmented scene reflects the characters are in agreement; and If the user makes the character shake his head, the augmented scene reflects the character may be in disagreement; 2) if the user makes Bernie bow to Burt, the augmented scene may reflect Bernie greeting Burt; 3) if the user makes Dog 25 bounce up and down, the augmented Dog 35 can get excited and stay excited for a predetermined duration, affecting the scene accordingly; and 4) If the user makes Dog 25 to lay down, the augmented Dog 35 may appear to be tired; and if left there, it falls asleep. The other augmented characters may respond to Dog's actions such as shushing each other.

According to embodiments of the present disclosure, the ARD can be configured to perform environment-state interactions. The objects may reside in an augmented environment established by a background, such as the floor. A user can be encouraged to explore the environment and to interact with elements in the environment. In the following examples, the walls, doors and windows may be assumed to be virtual, not tangible elements. In some implementations, virtual elements in the augmented environment may be operated by the user, such as a closed window can be opened by 1) moving a character next to the window, 2) moving a character to face the window, or 3) being prompted by a character, for example an augmented Bernie says, "Hum, it's warm in here. Should I open the window?" This augmentation may be followed by an input from the user, such as making Bernie nod or shake his head. In addition, virtual elements in the augmented environment can be operated according to orientation of the ARD 14 with respect to the window. In one implementation, looking up at the window can trigger it to open, and looking down at the winder can trigger it to close.

In some implementations, moving the ARD 14 very close to a virtual window can trigger environment-state interactions. In addition, pushing the ARD 14 through the virtual window can cause the window to open allowing the ARD 14 to pass through. Furthermore, virtual elements in the augmented environment can be operated by taping on the screen, and/or issuing a voice command such as "open window."

Figure 17:
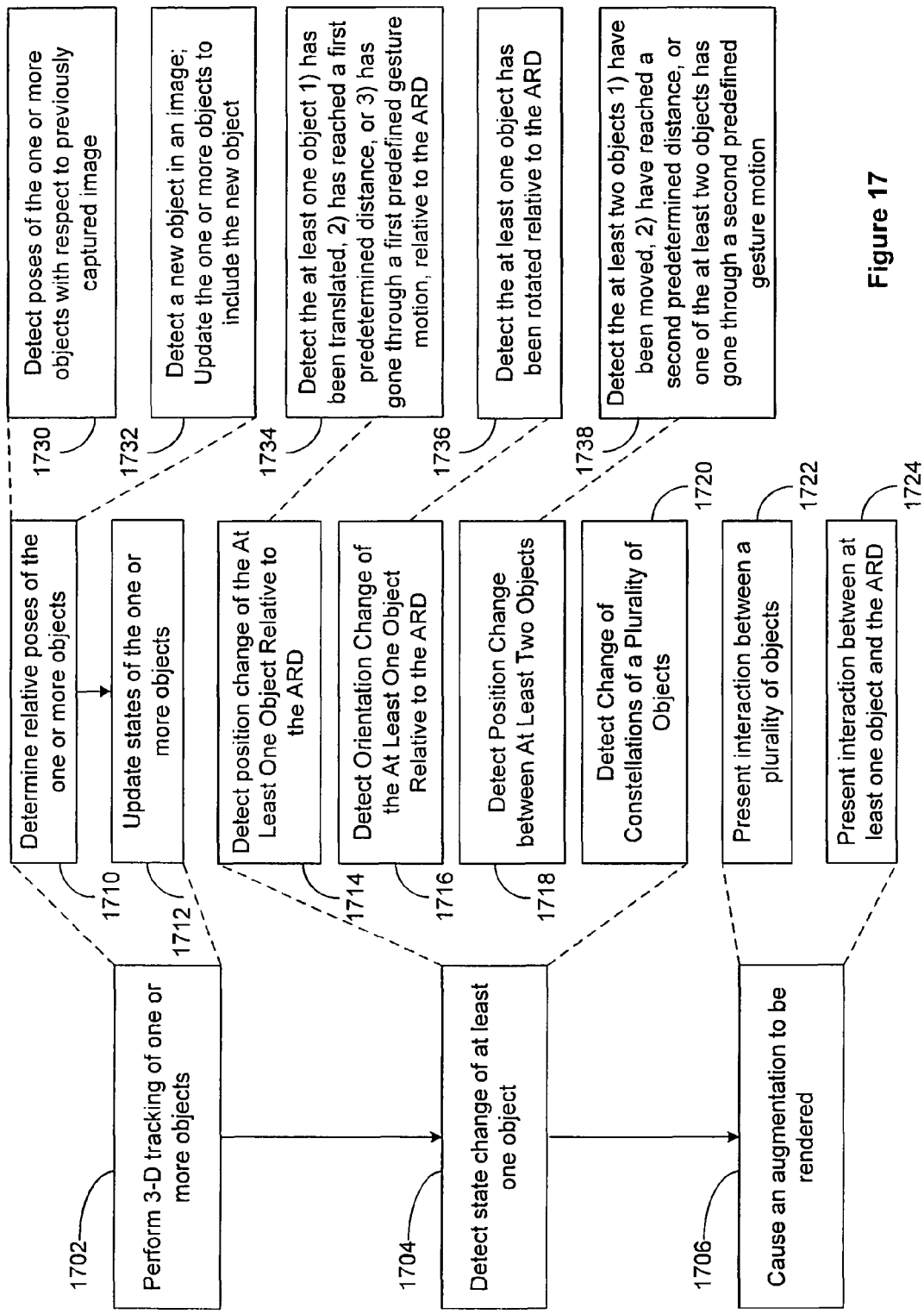
FIG. 17 illustrates a flow diagram of providing interactions of tangible and augmented reality objects in some embodiments.
Figure 18:
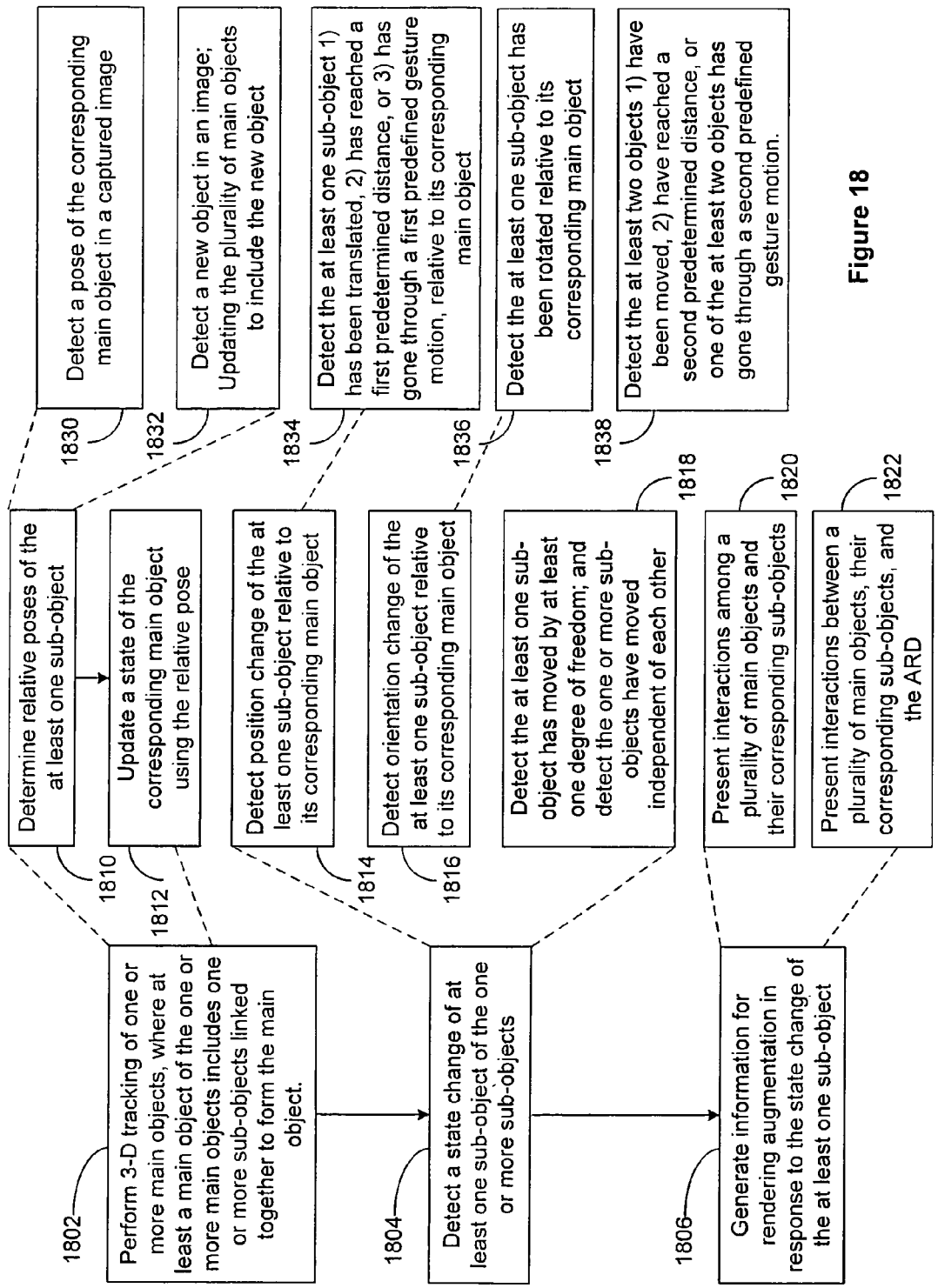
FIG. 18 illustrates another flow diagram of providing interactions of tangible and augmented reality objects in some embodiments.
Figure 19A:
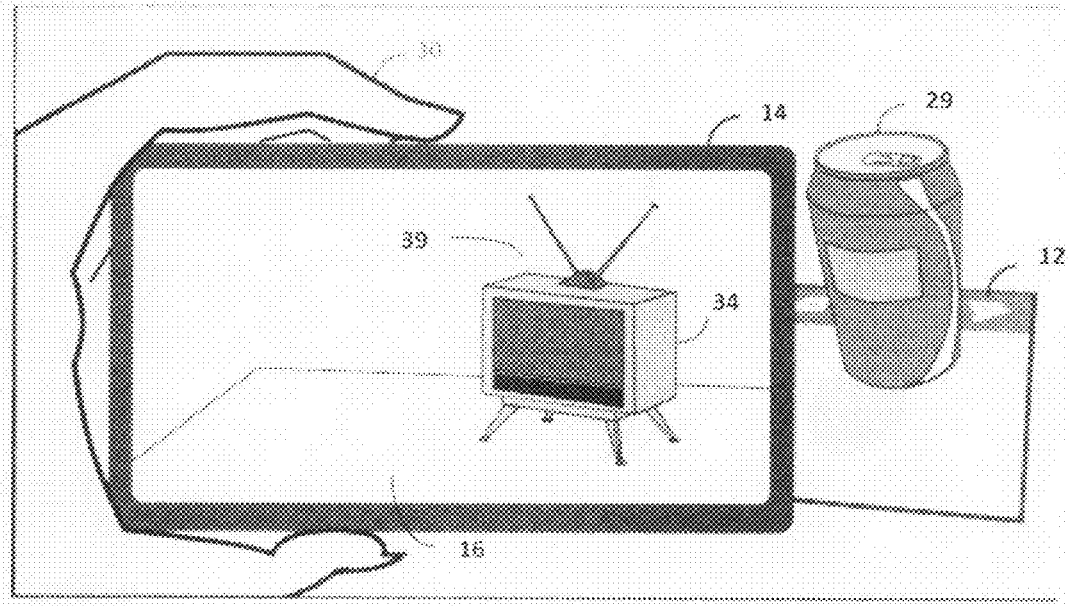
FIGS. 19A, 19B, 19C, and 19D illustrate an example of an ARD being used as an automated home control device according to some aspects of the present disclosure.
Figure 19B:
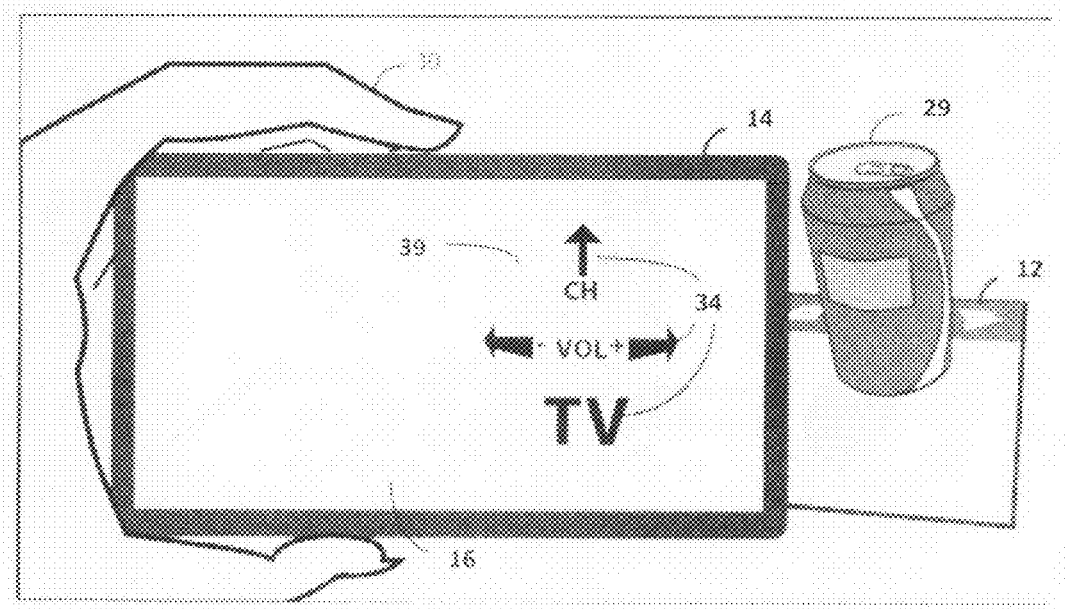
Figure 19C:
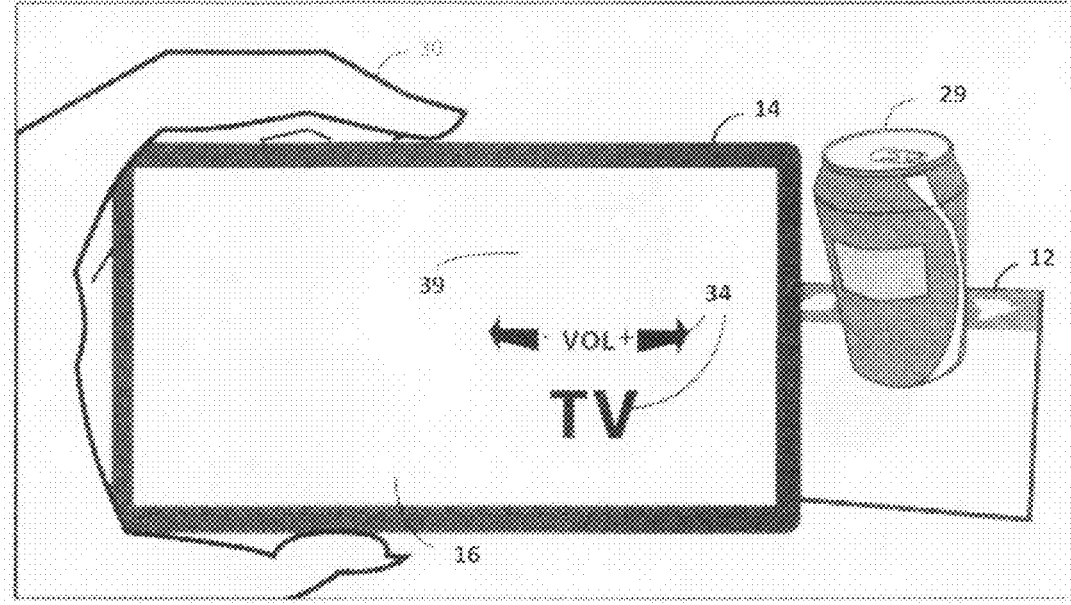
Figure 19D:
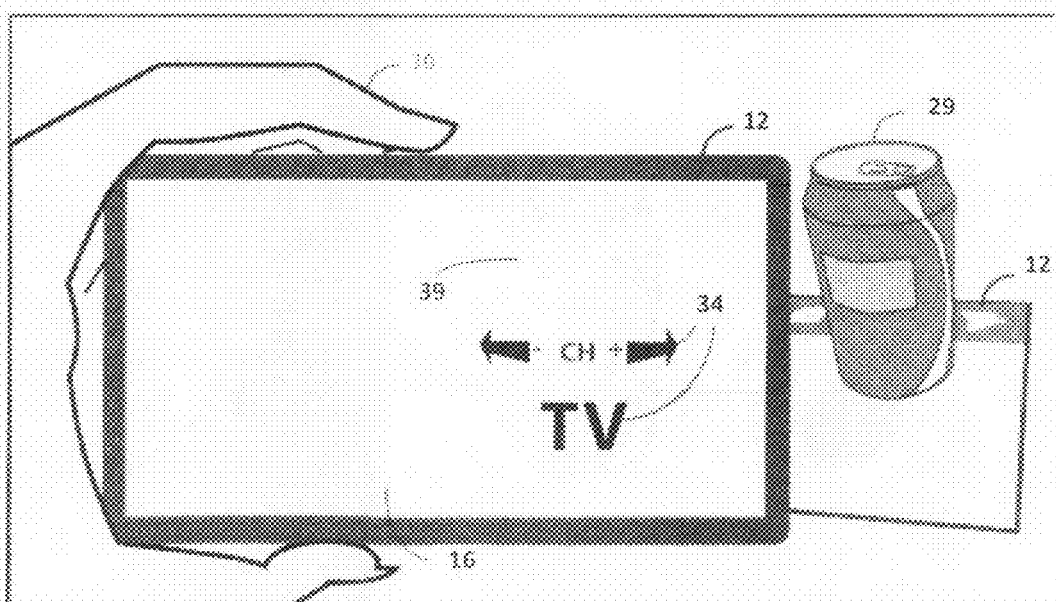
Figure 20:
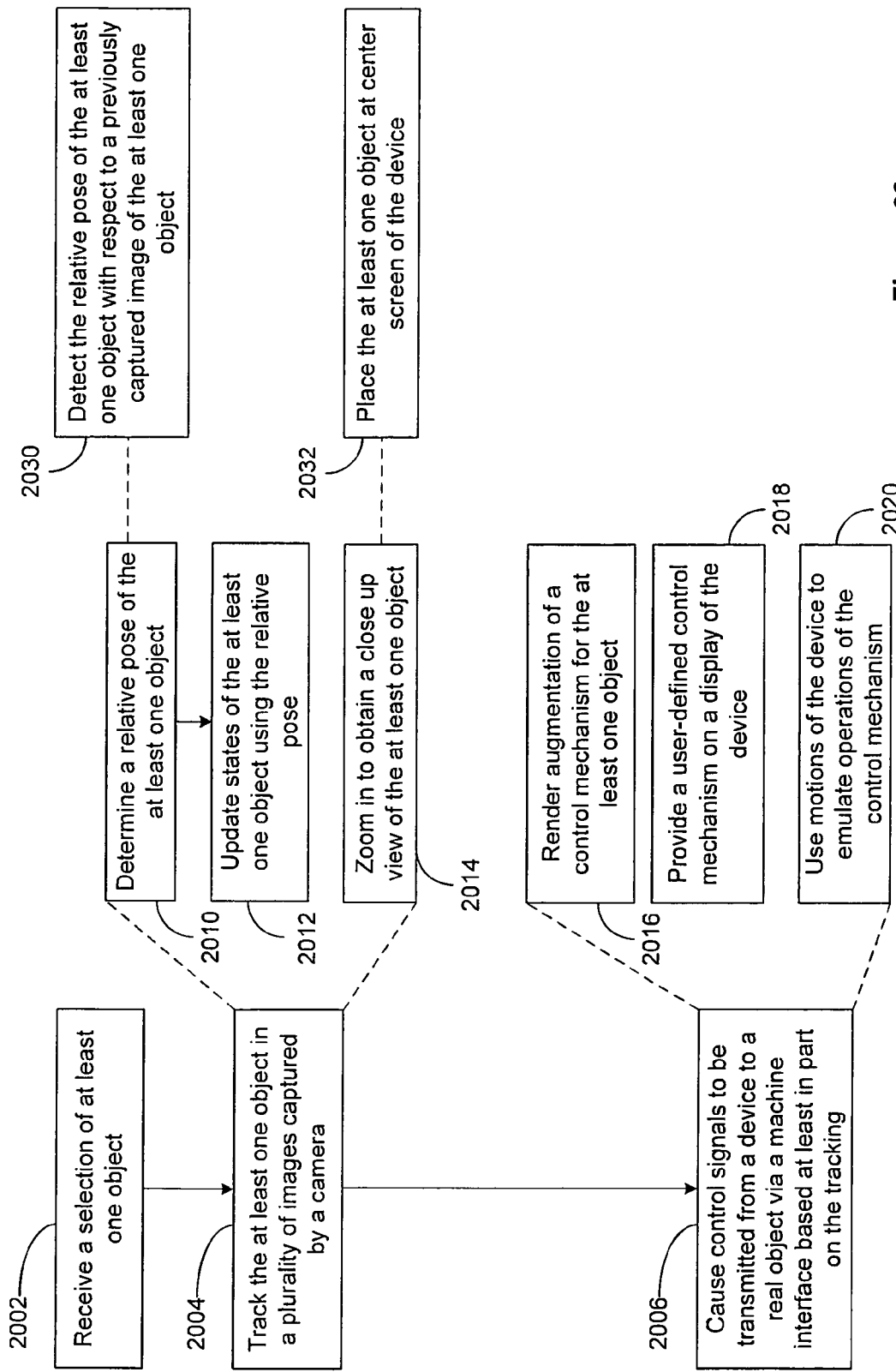
FIG. 20 illustrates yet another flow diagram of providing interactions of tangible and augmented reality objects in some embodiments.

According to some aspects of the present disclosure, the functions described in FIG. 17, FIG. 18, and FIG. 20 may be implemented by the control unit 120 of FIG. 2. In some implementations, the functions may be performed by processor 122, software 126, hardware 128, and firmware 130, or a combination of these blocks to perform various functions of the ARD described above, including the functions performed by the tracking unit 132 and the augmented reality user interface unit 134. FIG. 17 illustrates a flow diagram of providing interactions of tangible and augmented reality objects according to some aspects of the present disclosure. In block 1702, the control unit 120 can be configured to perform 3-dimensional tracking of one or more objects based at least in part on captured images of the one or more objects. In block 1704, the control unit 120 can be configured to detect a state change of at least one object of the one or more objects based at least in part on the captured images. In block 1706, the control unit 120 can be configured to cause an augmentation to be rendered in response to the state change of the at least one object, where a type of the augmentation is based at least in part on the state change of the at least one object. Note that the one or more objects may include a plurality of objects.

According to embodiments of the present disclosure, the methods performed in block 1702 may further include methods performed in blocks 1710-1712. For example, in block 1710, the control unit 120 can be configured to determine relative poses of the plurality of objects with respect to the ARD, and update states of the plurality of objects using the relative poses of the plurality of objects, where the states of the plurality of objects include relational information of the plurality of objects. The methods performed in block 1710 may further include methods performed in blocks 1730-1732. In block 1730, the control unit 120 detects poses of the plurality of objects with respect to a previously captured image of the plurality of objects. In block 1732, the control unit 120 detects a new object in an image, and updates the plurality of objects to include the new object. The relational information comprises at least one of: relationships among the plurality of objects in a game, relationships among the plurality of objects in a story, and relationships between the plurality of objects with respect to a background.

The methods performed in block 1704 may further include methods performed in blocks 1714-1720. In block 1714, the control unit 120 detects a position change of the at least one object relative to the ARD. In block 1716, the control unit 120 detects an orientation change of the at least one object relative to the ARD. In block 1718, the control unit 120 detects a position change between at least two objects. In block 1720, the control unit 120 detects change of constellations of a plurality of objects.

The methods performed in block 1714 may further include methods performed in block 1734, where the control unit 120 1) detects the at least one object has been translated relative to the ARD, 2) detects the at least one object has reached a first predetermined distance to the ARD, or 3) detects the at least one object has gone through a first predefined gesture motion relative to the ARD. The methods performed in block 1716 may further include methods performed in block 1736, where the control unit 120 detects the at least one object has been rotated relative to the ARD.

Similarly, the methods performed in block 1718 may further include methods performed in block 1738, where the control unit 120 1) detects the at least two objects have been moved relative to each other, 2) detects the at least two objects have reached a second predetermined distance to each other, and 3) detects one of the at least two objects has gone through a second predefined gesture motion relative to the other.

The methods performed in block 1706 may further include methods performed in blocks 1722-1724. The type of the augmentation may comprise, including but not limited to: 1) an interaction between a plurality of objects in a display of the ARD as described in block 1722, 2) an interaction between the at least one object and the ARD in a display of the ARD as described in block 1724, and 3) a depiction of one or more elements having a focus that based at least in part on the state change of the at least one object.

The state change of the at least one object may comprise at least one of: change in geometrical relationship between the ARD and the at least one object, change in geometrical relationship between the at least one object and another object in a field of view of a camera transmitting the captured images, and change in a feature of the at least one object.

The augmentation in block 1706 may comprise at least one of: an interaction based at least in part on view of the at least one object from the ARD, an interaction based at least in part on relative movements between the at least one object and the ARD, an interaction based at least in part on a distance between the at least one object and the ARD, an interaction based at least in part on a prompt from the at least one object, and an interaction based at least in part on a gesture from the at least one object.

The augmentation in block 1706 may further comprise at least one of: an interaction based at least in part on object-on-object in a plurality of objects, an interaction based at least in part on object-besides-object in the plurality of objects, an interaction based at least in part on object-above-object in the plurality of objects, an interaction based at least in part on object-in-object in the plurality of objects, and an interaction based at least in part on object-behind-object in the plurality of objects.

The method of detecting a state change of at least one object may comprise at least one of: detecting zooming in on the at least one object with respect to the ARD, and detecting zooming out of the at least one object with respect to the ARD.

FIG. 18 illustrates another flow diagram of providing interactions of tangible and augmented reality objects according to some aspects of the present disclosure. In block 1802, the control unit 120 can be configured to perform 3-dimensional tracking of one or more main objects based at least in part on captured images, where at least one main object of the one or more main objects includes one or more sub-objects linked together to form the at least one main object. In block 1804, the control unit 120 can be configured to detect a state change of at least one sub-object of the one or more sub-objects. In block 1806, the control unit 120 can be configured to generate information for rendering augmentation in response to the state change of the at least one sub-object.

According to embodiments of the present disclosure, the methods performed in block 1802 may further include methods performed in blocks 1810-1812. For example, in block 1810, the control unit 120 determines a relative pose of the at least one sub-object with respect to its corresponding main object. In block 1812, the control unit 120 updates a state of the corresponding main object using the relative pose of the at least one sub-object, where the state of the corresponding main object includes relational information of the corresponding main object. Methods performed in block 1810 may further include method's performed in blocks 1830-1832. In block 1830, the control unit 120 detects a pose of the corresponding main object in a captured image with respect to a previously captured image of the corresponding main object. In block 1832, the control unit 120 detects a new object in an image, and updates the one or more main objects to include the new object. Note that the relational information comprises at least one of including but not limited to: 1) relationships among the one or more main objects in a game, 2) relationships among the one or more main objects in a story, and 3) relationships between the one or more main objects with respect to a background.

Methods performed in block 1804 may further include methods performed in blocks 1814-1818. In block 1814, the control unit 120 detects position change of the at least one sub-object relative to its corresponding main object. In block 1816, the control unit 120 detects orientation change of the at least one sub-object relative to its corresponding main object. Methods performed in block 1814 may further include methods performed in blocks 1834. In block 1834, the control unit 120 detects the at least one sub-object has been translated relative to its corresponding main object, detects the at least one sub-object has reached a first pre-determined position relative to its corresponding main object, or detects the at least one sub-object has gone through a first predefined gesture motion relative to its corresponding main object. Methods performed in block 1816 may further include methods performed in blocks 1836. In block 1836, the control unit 120 detects the at least one sub-object has been rotated relative to its corresponding main object.

In block 1818, the control unit 120 detects the at least one sub-object has moved by at least one degree of freedom, or detects the one or more sub-objects have moved independent of each other. Methods performed in block 1806 may further include methods performed in blocks 1820-1822. In block 1820, the control unit 120 presents interactions among a plurality of main objects and their corresponding sub-objects in a display of the ARD. In block 1820, the control unit 120 presents interactions between a plurality of main objects, their corresponding sub-objects, and the ARD in a display of the ARD.

According to some aspects of the present disclosure, the state change may comprise addition of the at least one sub-object to its corresponding main object; and the state change may further comprise removal of the at least one sub-object from its corresponding main object. The information of block 1806 may be generated based on a pose of the at least one sub-object with respect to its corresponding main object, and a main object other than the corresponding main object. Methods performed in block 1806 may further include, but not limited to: 1) upon detecting door of a car being opened, presenting augmentations relating to entering the car; 2) upon detecting hood of the car being opened, presenting augmentations relating to checking engine of the car; 3) upon detecting hood of the car being opened, presenting augmentations relating to fixing engine of the car; and 4) upon detecting trunk of the car being opened, presenting augmentations relating to loading the car.

FIG. 20 illustrates yet another flow diagram of providing interactions of tangible and augmented reality objects according to some aspects of the present disclosure. In block 2002, the control unit 120 can be configured to receive a selection of at least one object. In block 2004, the control unit 120 can be configured to track at least one object in a plurality of images captured by the camera. In block 2006, the control unit 120 can be configured to cause control signals to be transmitted from the device to the real object via a machine interface based at least in part on the tracking.

Methods performed in block 2004 may further include methods performed in blocks 2010-2014. In block 2010, the control unit 120 determines a relative pose of the at least one object with respect to the device. In block 2012, the control unit 120 updates states of the at least one object using the relative pose. The control unit 120 zooms in to obtain a close up view of the at least one object in block 2014, and places the at least one object at center screen of the device in block 2032. Methods performed in block 2010 may further include methods performed in blocks 2030. In block 2030, the control unit 120 detects the relative pose of the at least one object with respect to a previously captured image of the at least one object.

Methods performed in block 2006 may further include methods performed in blocks 2016-2020. In block 2016, the control unit 120 renders augmentation of a control mechanism for the at least one object; and in block 2018, the control unit 120 provides a user-defined control mechanism on a display of the device. In block 2020, the control unit 120 uses motions of the device to emulate operations of the control mechanism.

Note that the machine interface of block 2006 may include, but not limited to Bluetooth, Wi-Fi, and IR. The at least one image of the plurality of images is displayed on a touchscreen of the device, and where receiving a selection of at least one object may comprise receiving information regarding a user input on the touchscreen.

In one exemplary application, the control unit 120 can be configured to track a radio in view of the device, provide an augmentation of a song playing by the radio, and adjust a volume of the song based on determining that the radio has been spun. In another exemplary application, the control unit 120 can be configured to track a television in view of the device, determining that an object has been placed near the television, and trigger an augmentation of video playing on the television based on the placed object. In yet another exemplary application, the control unit 120 can be configured to track a post-it note that shows a reminder of a TV show, and causes changes to record settings of a digital video recorder to record the TV show.

FIGS. 19A, 19B, 19C, and 19D illustrate an example of an augmented reality enabled device being used as an automated home control device. In the example illustrated in FIGS. 19A, 19B, 19C, and 19D, a household item 29, a cola can, and household item 12, a magazine, is illustrated and augmented object 34 is provided for the household items 29 and 12 on the ARD 14. Other types of household object or other types of objects may also be used.

In some implementations, the augmented object 34 can completely cover the tangible object (may also be referred to as real-world object or real object) associated with the augmented object 34. In other implementations, the augmented object 34 can cover only part of the tangible item. For example, the tangible item may be seen covered by a part of the augmented object 34 or the tangible item may be filtered to provide a more subtle appearance. Some examples of the types of filters that may be applied are filters to reduce the brightness, contrast, and/or saturation of the tangible item relative to the rest of the scene. In some implementations, environmental augmentation can be used to cover all or some of a tangible item, even if the augmentation content may be smaller than the image of the item. For example, the augmentation content 16 covers the tangible item, magazine 12, in the example illustrated in FIG. 19A. The augmentation content 16 may be smaller than the cola can 29, but the environmental augmentation has reduced the contrast and saturation of the can in the augmentation content displayed by the ARD 14.

In some implementations, such as in the example illustrated in FIGS. 19A, 19B, 19C, and 19D, the augmentation content provided for a tangible item may be of a different type of object than the tangible item. For example, the cola can 29 in FIGS. 19A, 19B, 19C, and 19D has been replaced with augmented object 34 that looks like a television set. Other types of representations may be used. The association of augmentation content with a tangible item can be: (1) permanent—lasting across multiple AR session until the association between the tangible item and the augmentation content is reassigned; (2) sticky—lasting the duration of a usage session (e.g. as long as the application is turned on); or (3) loose, lasting just for the duration of the "scene."

According to aspects of the present disclosure, certain objects that can be used in conjunction with the ARD 14 may have aspects of personification associated with them, such as one or more facial features (e.g., eyes, mouth, or ears) or other features (e.g., animated movement). The augmentation logic of the ARD 14 can be configured to provide augmentation content associated with a uses these aspects of personification to communicate with a user of the device. For example, an augmented representation of the toy can be animated to exhibit emotions, move about a scene, sing, talk, and show focus (or "listen") to the user.

An object may reside on a target reference background. For example, a toy may reside on a floor, tabletop, a play mat, or other surface. The ARD 14 can be configured to track a reference floor plus one or more toys. The ARD 14 can optionally overlay background augmentation over the floor and other parts of the real world in the AR view provided by the ARD 14. FIGS. 19A, 19B, 19C, and 19D illustrate an example where an item, cola can 29, resides on a target reference background 12, such as a magazine, which can serve as a reference plane for the augmented content displayed on the ARD 14. Other target reference backgrounds, such as a table top, a book, a piece of paper, a wall, or other item can also service as the reference plane. Inclusion of a reference plane in the augmentation content provided by the ARD 14 can be optional.

FIG. 20 illustrates yet another flow diagram of providing interactions of tangible and augmented reality objects according to some aspects of the present disclosure. In block 2002, the control unit 120 can be configured to receive a selection of at least one object. In block 2004, the control unit 120 can be configured to track at least one object in a plurality of images captured by the camera. In block 2006, the control unit 120 can be configured to cause control signals to be transmitted from the device to the real object via a machine interface based at least in part on the tracking.

Methods performed in block 2004 may further include methods performed in blocks 2010-2014. In block 2010, the control unit 120 determines a relative pose of the at least one object with respect to the device. In block 2012, the control unit 120 updates states of the at least one object using the relative pose. The control unit 120 zooms in to obtain a close up view of the at least one object in block 2014. and places the at least one object at center screen of the device in block 2032. Methods performed in block 2010 may further include methods performed in blocks 2030. In block 2030, the control unit 120 detects the relative pose of the at least one object with respect to a previously captured image of the at least one object.

Methods performed in block 2006 may further include methods performed in blocks 2016-2020. In block 2016, the control unit 120 renders augmentation of a control mechanism for the at least one object; and in block 2018, the control unit 120 provides a user-defined control mechanism on a display of the device. In block 2020, the control unit 120 uses motions of the device to emulate operations of the control mechanism.

Note that the machine interface of block 2006 may include, but not limited to Bluetooth, Wi-Fi, and IR. The at least one image of the plurality of images is displayed on a touchscreen of the device, and where receiving a selection of at least one object may comprise receiving information regarding a user input on the touchscreen.

According to aspects of the present disclosure, identifying and tracking features in image frames may be performed using a number of techniques. In one approach, a method of identifying features may be performed by examining the minimum eigenvalue of each 2 by 2 gradient matrix. Then the features are tracked using a Newton-Raphson method of minimizing the difference between the two windows. The method of multi-resolution tracking allows for relatively large displacements between images. Note that during tracking of features from one frame to the next frame, errors may accumulate. To detect potentially bad features, the mobile device may be configured to monitor whether the image signal in the window around the feature in the current frame is still similar to the image signal around the feature in the previous frame. Since features may be tracked over many frames, the image content may be deformed. To address this issue, consistency check may be performed with a similarity or an affine mapping.

According to aspects of the present disclosure, to identify an object in an image, points on the object may be extracted to provide feature descriptions (also referred to as keypoints, feature points or features for short) of the object. This description, extracted from a training image, may then be used to identify the object when attempting to locate the object in a test image containing many other objects. To perform reliable recognition, the features extracted from the training image may be detectable even under changes in image scale, noise and illumination. Such points usually lie on high-contrast regions of the image, such as object edges.

Another characteristic of these features is that the relative positions between them in the original scene may not change from one image to another. For example, if only the four corners of a door are used as features, they may work regardless of the door's position; but if points in the frame are used, the recognition may fail if the door is opened or closed. Similarly, features located in articulated or flexible objects may typically not work if any change in their internal geometry happens between two images in the set being processed. In some implementations, SIFT detects and uses a larger number of features from the images, which can reduce the contribution of the errors caused by the local variations in the average error of all feature matching errors. Thus, the disclosed method may identify objects even among clutter and under partial occlusion; because the SIFT feature descriptor can be invariant to uniform scaling, orientation, and partially invariant to affine distortion and illumination changes.

For example, keypoints of an object may first be extracted from a set of reference images and stored in a database. An object is recognized in a new image by comparing each feature from the new image to this database and finding candidate matching features based on Euclidean distance of their feature vectors. From the full set of matches, subsets of keypoints that agree on the object and its location, scale, and orientation in the new image may be identified to filter out good matches. The determination of consistent clusters may be performed by using a hash table implementation of a generalized Hough transform. Each cluster of 3 or more features that agree on an object and its pose may then be subject to further detailed model verification and subsequently outliers may be discarded. The probability that a particular set of features indicates the presence of an object may then be computed based on the accuracy of fit and number of probable false matches. Object matches that pass the tests can be identified as correct with high confidence.

According to aspects of the present disclosure, image feature generation transforms an image into a large collection of feature vectors, each of which may be invariant to image translation, scaling, and rotation, as well as invariant to illumination changes and robust to local geometric distortion. These features share similar properties with neurons in inferior temporal cortex that are used for object recognition in primate vision. Key locations may be defined as maxima and minima of the result of difference of Gaussians function applied in scale space to a series of smoothed and resampled images. Low contrast candidate points and edge response points along an edge may be discarded. Dominant orientations are assigned to localized keypoints. This approach ensures that the keypoints are more stable for matching and recognition. SIFT descriptors robust to local affine distortion may then be obtained by considering pixels around a radius of the key location, blurring and resampling of local image orientation planes.

Features matching and indexing may include storing SIFT keys and identifying matching keys from the new image. In one approach, a modification of the k-d tree algorithm which is also referred to as the best-bin-first search method that may be used to identify the nearest neighbors with high probability using a limited amount of computation. The best-bin-first algorithm uses a modified search ordering for the k-d tree algorithm so that bins in feature space may be searched in the order of their closest distance from the query location. This search order requires the use of a heap-based priority queue for efficient determination of the search order. The best candidate match for each keypoint may be found by identifying its nearest neighbor in the database of keypoints from training images. The nearest neighbors can be defined as the keypoints with minimum Euclidean distance from the given descriptor vector. The probability that a match is correct can be determined by taking the ratio of distance from the closest neighbor to the distance of the second closest.

In one exemplary implementation, matches in which the distance ratio is greater than 0.8 may be rejected, which eliminates 90% of the false matches while discarding less than 5% of the correct matches. To further improve the efficiency of the best-bin-first algorithm, search may be cut off after checking a predetermined number (for example 100) nearest neighbor candidates. For a database of 100,000 keypoints, this may provide a speedup over exact nearest neighbor search by about 2 orders of magnitude, yet results in less than a 5% loss in the number of correct matches.

Note that with the exemplary implementation, the Hough Transform may be used to cluster reliable model hypotheses to search for keys that agree upon a particular model pose. Hough transform may be used to identify clusters of features with a consistent interpretation by using each feature to. vote for object poses that may be consistent with the feature. When clusters of features are found to vote for the same pose of an object, the probability of the interpretation being correct may be higher than for any single feature. An entry in a hash table may be created to predict the model location, orientation, and scale from the match hypothesis. The hash table can be searched to identify clusters of at least 3 entries in a bin, and the bins may be sorted into decreasing order of size.

According to aspects of the present disclosure, each of the SIFT keypoints may specify 2D location, scale, and orientation. In addition, each matched keypoint in the database may have a record of its parameters relative to the training image in which it is found. The similarity transform implied by these 4 parameters may be an approximation to the 6 degree-of-freedom pose space for a 3D object and also does not account for any non-rigid deformations. Therefore, an exemplary implementation may use broad bin sizes of 30 degrees for orientation, a factor of 2 for scale, and 0.25 times the maximum projected training image dimension (using the predicted scale) for location. The SIFT key samples generated at the larger scale may be given twice the weight of those at the smaller scale. With this approach, the larger scale may in effect able to filter the most likely neighbors for checking at the smaller scale. This approach also improves recognition performance by giving more weight to the least-noisy scale. According to aspects of the present disclosure, to avoid the issue of boundary effects in bin assignment, each keypoint match may vote for the 2 closest bins in each dimension, giving a total of 16 entries for each hypothesis and further broadening the pose range.

According to aspects of the present disclosure, outliers may be removed by checking for agreement between each image feature and the model, for a given parameter solution. For example, given a linear least squares solution, each match may be required to agree within half the error range that is used for the parameters in the Hough transform bins. As outliers are discarded, the linear least squares solution may be resolved with the remaining points, and the process may be iterated. In some implementations, if less than a predetermined number of points (e.g. 3 points) remain after discarding outliers, the match may be rejected. In addition, a top-down matching phase may be used to add any further matches that agree with the projected model position, which may have been missed from the Hough transform bin due to the similarity transform approximation or other errors.

The decision to accept or reject a model hypothesis can be based on a detailed probabilistic model. The method first computes an expected number of false matches to the model pose, given the projected size of the model, the number of features within the region, and the accuracy of the fit. A Bayesian probability analysis can then give the probability that the object may be present based on the actual number of matching features found. A model may be accepted if the final probability for a correct interpretation is greater than a predetermined percentage (for example 95%).

According to aspects of the present disclosure, in one approach, rotation invariant feature transform (RIFT) method may be employed as a rotation-invariant generalization of SIFT to address under clutter or partial occlusion situations. The RIFT descriptor may be constructed using circular normalized patches divided into concentric rings of equal width and within each ring a gradient orientation histogram may be computed. To maintain rotation invariance, the orientation may be measured at each point relative to the direction pointing outward from the center.

In another approach, a generalized robust invariant feature (G-RIF) method may be used. The G-RIF encodes edge orientation, edge density and hue information in a unified form combining perceptual information with spatial encoding. The object recognition scheme uses neighboring context based voting to estimate object models.

In yet another approach, a speeded up robust feature (SURF) method may be used which uses a scale and rotation-invariant interest point detector/descriptor that can outperform previously proposed schemes with respect to repeatability, distinctiveness, and robustness. SURF relies on integral images for image convolutions to reduce computation time, and builds on the strengths of the leading existing detectors and descriptors (using a fast Hessian matrix-based measure for the detector and a distribution-based descriptor). The SURF method describes a distribution of Haar wavelet responses within the interest point neighborhood. Integral images may be used for speed, and 64 dimensions may be used to reduce the time for feature computation and matching. The indexing step may be based on the sign of the Laplacian, which increases the matching speed and the robustness of the descriptor.

In yet another approach, the principle component analysis SIFT (PCA-SIFT) method may be used. In some implementations, the PCA-SIFT descriptor is a vector of image gradients in x and y direction computed within the support region. The gradient region can be sampled at 39×39 locations. Thus, the vector can be of dimension 3042. The dimension can be reduced to 36 with PCA. In yet another approach, the Gradient location-orientation histogram (GLOH) method can be employed, which is an extension of the SIFT descriptor designed to increase its robustness and distinctiveness. In some implementations, the SIFT descriptor can be computed for a log-polar location grid with three bins in radial direction (the radius set to 6, 11, and 15) and 8 in angular direction, which results in 17 location bins. The central bin may not be divided in angular directions. The gradient orientations may be quantized in 16 bins resulting in 272 bin histogram. The size of this descriptor can be reduced with PCA. The covariance matrix for PCA can be estimated on image patches collected from various images. The 128 largest eigenvectors may then be used for description.

In yet another approach, a two-object recognition algorithm may be employed to use with the limitations of current mobile devices. In contrast to the classic SIFT approach, the Features from Accelerated Segment Test (FAST) corner detector can be used for feature detection. This approach distinguishes between the off-line preparation phase where features may be created at different scale levels and the on-line phase where features may be created at a current fixed scale level of the mobile device's camera image. In one exemplary implementation, features may be created from a predetermined fixed patch size (for example 15×15 pixels) and form a SIFT descriptor with 36 dimensions. The approach can be further extended by integrating a scalable vocabulary tree in the recognition pipeline. This allows an efficient recognition of a larger number of objects on mobile devices.

According to aspects of the present disclosure, the detection and description of local image features can help in object recognition. The SIFT features can be local and based on the appearance of the object at particular interest points, and may be invariant to image scale and rotation. They may also be robust to changes in illumination, noise, and minor changes in viewpoint. In addition to these properties, the features may be highly distinctive, relatively easy to extract and allow for correct object identification with low probability of mismatch. The features can be relatively easy to match against a (large) database of local features, and generally probabilistic algorithms such as k-dimensional (k-d) trees with best-bin-first search may be used. Object descriptions by a set of SIFT features may also be robust to partial occlusion. For example, as few as 3 SIFT features from an object may be sufficient to compute its location and pose. In some implementations, recognition may be performed in quasi real time, for small databases and on modern computer hardware.

According to aspects of the present disclosure, the random sample consensus (RANSAC) technique may be employed to remove outliers caused by moving objects in view of the camera. Note that the RANSAC uses an iterative method to estimate parameters of a mathematical model from a set of observed data which contains outliers. This method can be a non-deterministic as it produces a reasonable result with an associated probability, where the probability may increase as more iteration is performed.

In one exemplary implementation, a set of observed data values, a parameterized model which can be fitted to the observations with corresponding confidence parameters. In this exemplary implementation, the method iteratively selects a random subset of the original data. These data can be hypothetical inliers and the hypothesis may then be tested as follows:
1. A model can be fitted to the hypothetical inliers, i.e. all free parameters of the model are reconstructed from the inliers.
2. All other data can then be tested against the fitted model and, if a point fits well to the estimated model; it can be considered as a hypothetical inlier.
3. The estimated model can be considered acceptable if sufficiently number of points have been classified as hypothetical inliers.
4. The model can be re-estimated from all hypothetical inliers, because it has only been estimated from the initial set of hypothetical inliers.
5. Finally, the model can be evaluated by estimating the error of the inliers relative to the model.

The above procedure can be repeated for a predetermined number of times, each time producing either a model which may be rejected because too few points are classified as inliers or a refined model together with a corresponding error measure. In the latter case, the refined model can be kept if the error is lower than the previously saved model.

In another exemplary implementation, moving objects in view of the camera can be actively identified and removed using a model based motion tracking method. In one approach, the objective of tracking can be treated as a problem of model recognition. A binary representation of the target can be tracked, and a Hausdorff distance based search can be used to search regions of the image for the object. For a binary representation of the target (a model), output from the standard canny edge detector of the Gaussian smoothed image can be augmented with the notion of a model history. At each frame, a Hausdorff search can be performed on each target, using the canny edges from the current image and the current model. In addition, an affine estimation may be performed to approximate the net background motion. From the results of these two searches, information can be gathered about the target, and be used to approximate the motion of the target, as well as separate the background from motion in the region of the target. To be able to handle hazard/unusual conditions (such as the object becoming occluded going into a shadow, the object leaving the frame, or camera image distortion providing bad image quality), history data about the target may be retained, such as the target's past motion and size change, characteristic views of the target (snapshots throughout time that provide an accurate representation of the different ways the target has been tracked), and match qualities in the past.

The history of tracking the target can be useful in more than just aiding hazard/unusual conditions; that part of a solid motion tracking method can involve history data, and not just a frame by frame method of motion comparison. This history state can provide information regarding how to decide what should be considered part of target (e.g. things moving close to the object moving at the same speed should be incorporated into the object), and with information about motion and size, the method can predictively estimate where a lost object may have gone, or where it might reappear (which has been useful in recovering targets that leave the frame and reappear later in time).

An inherent challenge in the motion tracking method may be caused by the fact that the camera can have an arbitrary movement (as opposed to a stationary camera), which makes developing a tracking system that can handle unpredictable changes in camera motion difficult. A computationally efficient affine background estimation scheme may be used to provide information as to the motion of the camera and scene.

According to aspects of the present disclosure, an affine transformation for the image can be performed at time t to the image at time t+dt, which allows correlating the motion in the two images. This background information allows the method to synthesize an image at time t+dt from the image at time t and the affine transform that can be an approximation of the net scene motion. This synthesized image can be useful in generating new model information and removing background clutter from the model space, because a difference of the actual image at t+dt and the generated image at t+dt can be taken to remove image features from the space surrounding targets.

In addition to the use of the affine transform as a tool to clean-up the search space, it can also be used to normalize the coordinate movement of the targets: by having a vector to track how the background may be moving, and a vector to track how the target may be moving, a difference of the two vector may be taken to generate a vector that describes the motion of the target with respect to the background. This vector allows the method to predictively match where the target should be, and anticipate hazard conditions (for example looking ahead in the direction of the motion can provide clues about upcoming obstacles, as well as keeping track of where the object may be in case of a hazard condition. When an object enters a hazard condition, the method may still be able to estimate the background motion, and use that coupled with the knowledge of the model's previous movements to guess where the model may reappear, or re-enter the frame.

The background estimation can be a key factor in the prolonged tracking of objects. Note that short term tracking may be performed without background estimation, but after a period of time, object distortion and hazards may be difficult to cope with effectively without a good estimation of the background.

According to aspects of the present disclosure, one of the advantages of using the Hausdorff distance as a matching operator is that it can be quite tolerant of changes in shape during matching, but using the Hausdorff distance as a matching operator may require the objects being tracked be more accurately defined.

In one approach, straight dilation-based methods of grabbing a new model from the time t+1 image can be used. Note that in some situations where there can be non-object features close to the object (which occurs quite often), the dilation method may not be effective because it may slowly incorporate the entire scene into the model. Thus, a method of updating the model from frame to frame that can be tolerant to changes in the model shape, but not so relaxed that causing incorporating non-model pixels into the model may be adopted. One exemplary implementation is to use a combination of background removal and adding the previous models to the current model match window and taking what seems to be stable pixels, as well as the new ones surrounding them, which over time may either get eliminated from the model because they may not be stable, or get incorporated into the model. This approach can be effective in keeping the models relatively clean from clutter in the image. For example, with this approach, no longer does a road close to a truck get pulled into the model pixel by pixel. Note that the models may appear to be dilated, but this may be a result of the history effect of how the models are constructed, but it may also have the feature of making the search results more definite because this method can have more model pixels to possibly match in the next frame.

Note that at each frame, there may be a significant amount of computation to be performed. According to some implementations, the mobile device can be configured to perform smoothing/feature extraction, Hausdorff matching each target (for example one match per model), as well as affine background estimation. Each of these operations can be quite computationally expensive individually. In order to achieve real-time performance on a mobile device, the design can be configured to use as much parallelism as possible.

Note that at least the following three paragraphs, FIGS. 1-2, FIGS. 17-20 and their corresponding descriptions provide means for means for receiving a selection of at least one object, means for tracking the at least one object in a plurality of images captured by the camera, and means for causing control signals to be transmitted from the device to the real object via a machine interface based at least in part on the tracking.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of controlling a real object using a device having a camera, comprising:
    receiving a selection of at least one object, wherein the real object, the device, and the at least one object comprise separate objects, and wherein each of the real object, the device, and the at least one object is a physical object;
    tracking the at least one object in a plurality of images captured by the camera;
    rendering augmentation of a user-defined control mechanism for the at least one object based at least in part on the tracking;
    displaying the user-defined control mechanism overlaying the at least one object on a display of the device;
    using motions of the device to emulate operations of the user-defined control mechanism; and
    causing control signals to be transmitted from the device to the real object via a machine interface.

2. The method of claim 1, wherein the tracking comprises performing 3-dimensional tracking comprising:
    determining a relative pose of the at least one object with respect to the device; and
    updating states of the at least one object using the relative pose.

3. The method of claim 2, wherein determining a relative pose comprises:
    detecting the relative pose of the at least one object with respect to a previously captured image of the at least one object.

4. The method of claim 1, wherein the receiving comprises:
    identifying a zooming in to obtain a close up view of the at least one object.

5. The method of claim 1, wherein the receiving comprises:
    determining that the at least one object has been placed at center screen of the device.

6. The method of claim 1, wherein the machine interface comprises at least one of:
    Bluetooth;
    Wi-Fi; and
    IR.

7. The method of claim 1, wherein at least one image of the plurality of images is displayed on a touchscreen of the device, and wherein receiving a selection of at least one object comprises receiving information regarding a user input on the touchscreen identifying the at least one object.

8. The method of claim 1, further comprising:
    tracking a radio in view of the device;
    providing an augmentation of a song playing by the radio; and
    adjusting a volume of the song based on determining that the radio has been spun.

9. The method of claim 1, further comprising:
    tracking a television in view of the device;
    determining that an object has been placed near the television; and
    triggering an augmentation of video playing on the television based on the object having been placed near the television.

10. The method of claim 1, wherein:
    the causing comprises determining that the at least one object has been rotated, and wherein the control signals comprise signals instructing the real object to change channel or change volume.

11. A device for controlling a real object, comprising:
    a camera;
    a control unit including processing logic, the processing logic comprising:
    logic configured to receive a selection of at least one object, wherein the real object, the device, and the at least one object comprise separate objects, and wherein each of the real object, the device, and the at least one object is a physical object;
    logic configured to track the at least one object in a plurality of images captured by the camera;
    logic configured to render augmentation of a user-defined control mechanism for the at least one object based at least in part on the tracking;
    logic configured to display the user-defined control mechanism overlaying the at least one object on a display of the device;
    logic configured to use motions of the device to emulate operations of the user-defined control mechanism; and
    logic configured to cause control signals to be transmitted from the device to the real object via a machine interface.

12. The device of claim 11, wherein the logic configured to track the at least one object comprises performing 3-dimensional tracking comprising:
    logic configured to determine a relative pose of the at least one object with respect to the device; and
    logic configured to update states of the at least one object using the relative pose.

13. The device of claim 12, wherein logic configured to determine relative poses comprises:
    logic configured to detect the relative pose of the at least one object with respect to a previously captured image of the at least one object.

14. The device of claim 12, wherein logic configured to receive the selection comprises:
    logic configured to identify a zoom in to a close up view of the at least one object.

15. The device of claim 11, wherein logic configured to receive the selection comprises:
logic configured to determine that the at least one object has been placed at center screen of the device.

16. The device of claim 11, wherein the machine interface comprises at least one of:
Bluetooth;
Wi-Fi; and
IR.

17. The device of claim 11, wherein at least one image of the plurality of images is displayed on a touchscreen of the device, and wherein logic configured to receive a selection of at least one object comprises logic configured to receive information regarding a user input on the touchscreen identifying the at least one object.

18. The device of claim 11, further comprising:
logic configured to track a radio in view of the device;
logic configured to provide an augmentation of a song playing by the radio; and
logic configured to adjust a volume of the song based on determining that the radio has been spun.

19. The device of claim 11, further comprising:
logic configured to track a television in view of the device;
logic configured to determine that an object has been placed near the television; and
logic configured to trigger an augmentation of video playing on the television based on the object having been placed near the television.

20. The device of claim 11, wherein:
the logic configured to cause control signals to be transmitted comprises logic configured to determine that the at least one object has been rotated, and wherein the control signals comprise signals instructing the real object to change channel or change volume.

21. A non-transitory medium storing instructions for execution by one or more computer systems for controlling a real object using a device having a camera, the instructions comprising:
instructions for receiving a selection of at least one object, wherein the real object, the device, and the at least one object comprise separate objects, and wherein each of the real object, the device, and the at least one object is a physical object;
instructions for tracking the at least one object in a plurality of images captured by the camera;
instructions for rendering augmentation of a user-defined control mechanism for the at least one object based at least in part on the tracking;
instructions for displaying the user-defined control mechanism overlaying the at least one object on a display of the device;
instructions for using motions of the device to emulate operations of the user-defined control mechanism; and
instructions for causing control signals to be transmitted from the device to the real object via a machine interface.

22. A system for controlling a real object using a device having a camera, comprising:
means for receiving a selection of at least one object, wherein the real object, the device, and the at least one object comprise separate objects, and wherein each of the real object, the device, and the at least one object is a physical object;
means for tracking the at least one object in a plurality of images captured by the camera;
means for rendering augmentation of a user-defined control mechanism for the at least one object based at least in part on the tracking;
means for displaying the user-defined control mechanism overlaying the at least one object on a display of the device;
means for using motions of the device to emulate operations of the user-defined control mechanism; and
means for causing control signals to be transmitted from the device to the real object via a machine interface.

23. The system of claim 22, wherein the tracking comprises means for performing 3-dimensional tracking comprising:
means for determining a relative pose of the at least one object with respect to the device; and
means for updating states of the at least one object using the relative pose.

24. The system of claim 23, wherein means for determining a relative pose comprises:
means for detecting the relative pose of the at least one object with respect to a previously captured image of the at least one object.

25. The system of claim 22, wherein the receiving comprises:
means for identifying a zooming in to obtain a close up view of the at least one object.

26. The system of claim 22, wherein the receiving comprises:
means for determining that the at least one object has been placed at center screen of the device.

27. The system of claim 22, wherein the machine interface comprises at least one of:
Bluetooth;
Wi-Fi; and
IR.

28. The system of claim 22, wherein at least one image of the plurality of images is displayed on a touchscreen of the device, and wherein means for receiving a selection of at least one object comprises means for receiving information regarding a user input on the touchscreen identifying the at least one object.

29. The system of claim 22, further comprising:
means for tracking a radio in view of the device;
means for providing an augmentation of a song playing by the radio; and
means for adjusting a volume of the song based on determining that the radio has been spun.

30. The system of claim 22, further comprising:
means for tracking a television in view of the device;
means for determining that an object has been placed near the television; and
means for triggering an augmentation of video playing on the television based on the object having been placed near the television.

31. The system of claim 22, wherein:
the causing comprises determining that the at least one object has been rotated, and wherein the control signals comprise signals instructing the real object to change channel or change volume.

* * * * *